US012639589B2

(12) United States Patent
Yang et al.

(10) Patent No.: US 12,639,589 B2
(45) Date of Patent: May 26, 2026

(54) BOUNDING AREA PLANNING USING A CONGESTION PREDICTION MODEL

(71) Applicant: NVIDIA Corporation, Santa Clara, CA (US)

(72) Inventors: Tian Yang, Los Altos, CA (US); Shijia Hu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 636 days.

(21) Appl. No.: 18/300,877

(22) Filed: Apr. 14, 2023

(65) Prior Publication Data

US 2024/0346337 A1        Oct. 17, 2024

(51) Int. Cl.
*G06N 5/022* (2023.01)

(52) U.S. Cl.
CPC .................................... *G06N 5/022* (2013.01)

(58) Field of Classification Search
CPC ....................................................... G06N 5/022
See application file for complete search history.

(56) References Cited

U.S. PATENT DOCUMENTS

| | | | | | |
|---|---|---|---|---|---|
| 10,289,925 | B2 * | 5/2019 | Farooqi | .................. | G06F 18/241 |
| 10,467,508 | B2 * | 11/2019 | Wang | .................... | G06N 3/0464 |
| 11,989,948 | B1 * | 5/2024 | Fan | .......................... | G06V 10/82 |
| 12,175,337 | B2 * | 12/2024 | Gardner | ................ | G06F 40/242 |
| 2013/0272126 | A1 * | 10/2013 | Alpert | ................... | H04L 41/145 |
| | | | | | 370/235 |
| 2016/0071019 | A1 * | 3/2016 | Supanc | .................... | G06N 3/08 |
| | | | | | 706/25 |

| | | | | | |
|---|---|---|---|---|---|
| 2018/0114097 | A1 * | 4/2018 | Wang | ............... | G06V 30/18057 |
| 2018/0189604 | A1 * | 7/2018 | Zhang | ..................... | G06V 30/15 |
| 2021/0342516 | A1 | 11/2021 | Ren et al. | | |
| 2022/0222477 | A1 * | 7/2022 | Shen | ....................... | G06N 3/096 |
| 2022/0222480 | A1 * | 7/2022 | Jiang | ................... | G06N 3/0464 |
| 2022/0261593 | A1 * | 8/2022 | Yu | .......................... | G06F 18/214 |
| 2022/0292306 | A1 * | 9/2022 | Radhakrishnan | ...... | G06V 10/82 |
| 2023/0094155 | A1 * | 3/2023 | Cha | ......................... | G06V 20/13 |
| | | | | | 382/156 |
| 2023/0169101 | A1 * | 6/2023 | Yuan | ..................... | G06N 3/045 |
| | | | | | 707/722 |

(Continued)

OTHER PUBLICATIONS

Yibo Lin et al., "DREAMPlace: Deep Learning Toolkit-Enabled GPU Acceleration for Modern VLSI Placement", DAC 19: Proceedings of the 56th Annual Design Automation Conference 2019, Jun. 2019, Article No. 117, pp. 1-6, https://doi.org/10.1145/3316781.3317803.

*Primary Examiner* — David E Choi
(74) *Attorney, Agent, or Firm* — Lowenstein Sandler LLP

(57)        ABSTRACT

Apparatuses, systems, and techniques for bounding area planning using a congestion prediction model. Placement data associated with cells of an IC design is identified. A graph based on the identified placement data is generated. The graph is provided as input to a machine learning model. The machine learning model is trained to predict, based on a given graph associated with cells according to a respective IC design, a congestion level for cells at one or more bounding areas of a respective IC design. Outputs of the machine learning model are obtained. The outputs include congestion data indicating a congestion level for a first bounding area of the IC design. Cells are designated for installation at a region, of the IC design, corresponding to the first bounding area.

20 Claims, 10 Drawing Sheets

(56)        References Cited

U.S. PATENT DOCUMENTS

2023/0237827 A1*  7/2023  Yuan ................... G06V 30/414
                                                    382/175
2024/0020962 A1*  1/2024  Gubbi Lakshminarasimha ..........
                                                    G06N 3/045
2024/0249059 A1*  7/2024  Myung ................ G06F 30/392
2024/0256752 A1*  8/2024  Myung .................. G06F 30/27
2024/0346337 A1* 10/2024  Yang ........................ G06N 3/08

* cited by examiner

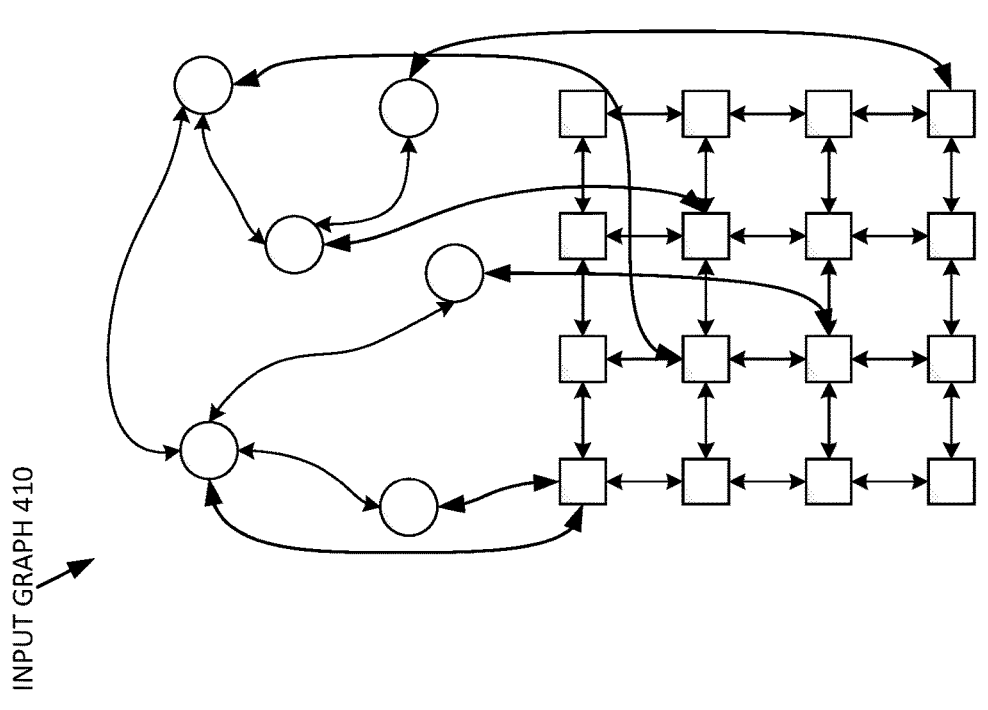
INPUT GRAPH 410
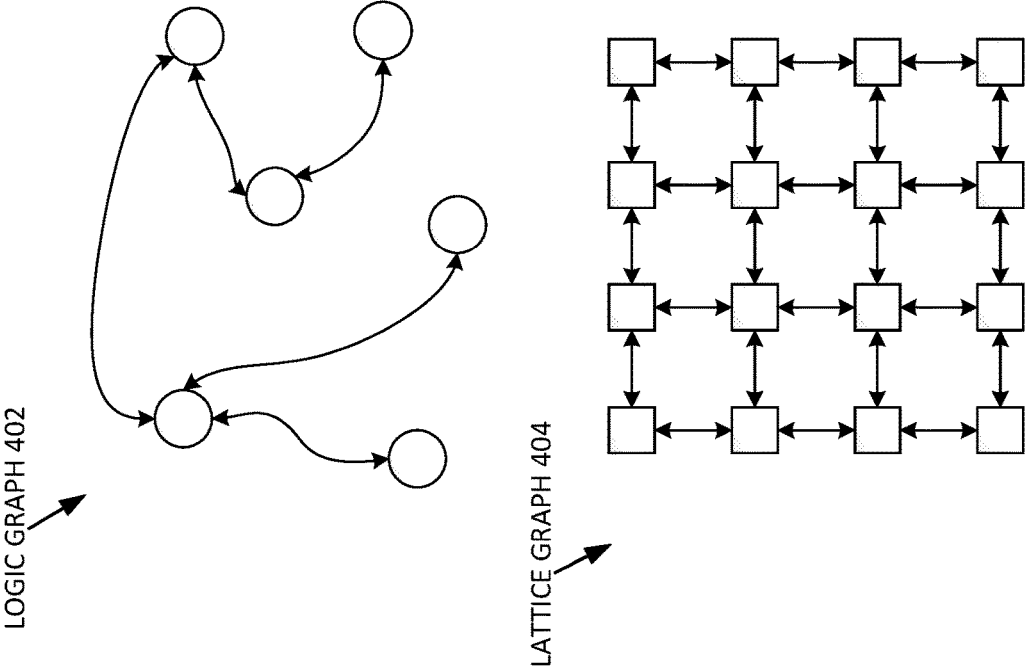
LOGIC GRAPH 402
LATTICE GRAPH 404
FIG. 4

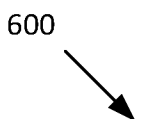

600

Identify placement data associated with cells of an IC design, the placement data indicating an initial placement location for each of the cells of the IC design
602

Generate a graph based on the identified placement data, one or more nodes of the graph correspond to a respective cell and a region, of the IC design, associated with the initial placement location for the respective cell, one or more edges of the graph correspond to a connection between two or more of the cells
604

Provide the graph as input to a machine learning model trained to predict, based on a give graph associated with cells according to a respective IC design, a congestion level for cells at one or more bounding areas of a respective IC design
606

Obtain one or more outputs of the machine learning model, the one or more outputs including congestion data indicating a congestion level for a first bounding area of the IC design, the first bounding area including at least one region, of the IC design, associated with the initial placement location of one or more of the cells
608

Responsive to determining that the indicated congestion level for the first bounding area satisfies one or more congestion criteria, designating the cells for installation at the at least one region, of the IC design, corresponding to the first bounding area
610

FIG. 6

700

Initialize a training set T to {} 710

Generate a training input based on a graph associated with cells of a prior IC design 712

Generate a target output based on an indication of a congestion level for a prior bounding area of the prior IC design 714

Generate a mapping between the training input and the target output 716

Add the mapping to training set T 718

NO     Is set T sufficient for training? 720

YES

Provide training set T to train a machine learning model 722

FIG. 7

BOUNDING AREA PLANNING USING A CONGESTION PREDICTION MODEL

TECHNICAL FIELD

Aspects and implementations of the present disclosure relate to bounding area planning using a congestion prediction model.

BACKGROUND

Very Large Scale Integration (VLSI) is the process of fabricating an integrated circuit (IC) by combining many Metal Oxide Semiconductor (MOS) transistors on a device (e.g., a chip) according to one or more IC designs. Placement and routing of a elements of an IC design within an optimal bounding area is a critical stage in the VLSI design process. In some instances, power, performance, and area may be optimized for an IC design during a placement and/or routing phase of the VLSI design process. In some instances, designers may seek to minimize an area (e.g., a bounding area) on which elements or groups of elements (e.g., cells) are place and/or routed according to an IC design.

BRIEF DESCRIPTION OF DRAWINGS

Various embodiments in accordance with the present disclosure will be described with reference to the drawings, in which:

FIG. 4 depicts an example graph generator for generating an input graph as input to a congestion prediction model, according to at least one embodiment;

FIG. 6 illustrates a flow diagram of an example method of using a machine learning model that is trained to provide a congestion prediction of an IC design, according to at least one embodiment;

FIG. 7 is a flow chart of a method for training a machine learning model, according to aspects of the present disclosure.

DETAILED DESCRIPTION

Figure 1:
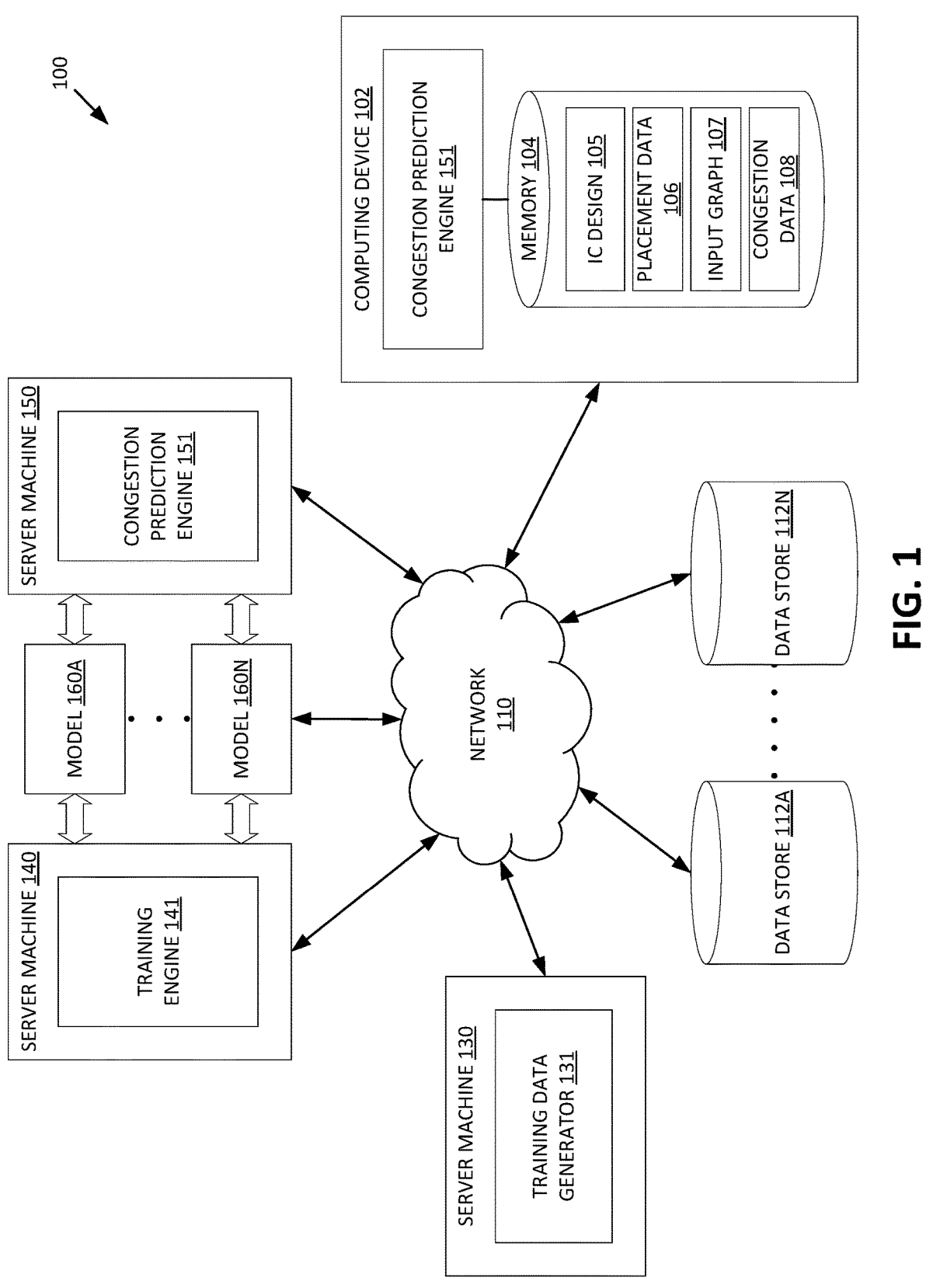
FIG. 1 is a block diagram of an example system architecture, according to at least one embodiment.

Aspects of the present disclosure generally relate to bounding area planning using a congestion prediction model. An integrated circuit (IC) (e.g., a very large scale integrated (VLSI) circuit) may be made up of several partitions (e.g., bounding areas) that may be integrated onto a device (e.g., a chip). A partition may include one or more cells (e.g., memory cells, logic cells, etc.) that provide a logic function and/or a storage function. During the IC design process, one or more cells may be identified for inclusion in a particular partition (e.g., based on a functionality or activity associated with the cells). Placement of a partition refers to determining a region of the IC to install cells of the partition.

Placement is an important phase of in the IC design process because the performance, routing, power consumption, congestion level, and/or heat distribution of a device may be affected by the placement of partitions of an IC design. Another important, and related, phase of the IC design process is routing. Routing is the process identifying physical connections (e.g., wires) for installation between two or more cells based on the logical connectivity of the IC design. The routing for a region of an IC design may impact a congestion level of signal traffic at that region. If the congestion level at a particular region of the IC design is too high, two or more physical connections (e.g., wires or nets) between cells at the particular region may connect with each other, causing a short after fabrication of the IC design. The congestion level may be reduced by increasing the bounding area for a partition. However, because a VLSI circuit may be made up of several partitions, increasing the bounding area for a particular partition of the VLSI circuit may interfere with the other partitions of the VLSI circuit. Accordingly, a designer may decrease bounding areas corresponding to the other partitions of the VLSI circuit to make room for the increased bounding area of the particular region. In such instances, the designer may reperform placement for the other partitions of the VLSI circuit according to the decreased bounding areas, which may take time and consume a large amount of computational resources. Therefore, the quality of routing may be determined according to the placement of the IC design.

In view of the above, IC designers are motivated to minimize a bounding area where cells of a partition are to be placed in an IC design while also minimizing the congestion level of cells. Conventional IC design techniques identify areas for placement of cells of a partition based on a standard cell utilization value, which is determined based on historic data and/or heuristic IC design data. A standard cell utilization value may indicate a ratio of the area of standard cells of the IC design to the area of the partition. However, different IC designs utilize different routing resources that may create different wire utilization across different partitions. Accordingly, a size of a region to include cells of a partition cannot be accurately predicted by adding the area of the partition cells together.

Conventional approaches do not account for differences between designs that affect routability of the IC design. For example, some IC designs have high cell density (e.g., 95% of a bounding area utilized for cells and 5% available for routing) while others have low cell density (e.g., 60% of a bounding area utilized for cells and 40% available for routing). IC designs that have high cell density may utilize fewer routing tracks, and therefore, may be placed within a smaller bounding area. IC designs that have low cell density may utilize more routing tracks, and therefore, may be placed within a large bounding area. As a result, large margins are conventionally given to each partition in order to account for variability among IC designs. A margin may correspond to the difference between a bounding area expected for a particular IC design and a bounding area the assigned for the IC design. When large margins are given to each partition (e.g., assigned bounding area is 10% greater than expected bounding area), some partitions may be significantly reduced in area after the partition has already been placed and routed, wasting chip space, and wasting resources. When small margins are given to each partition (e.g., assigned bounding area is 1% greater than expected bounding area), some partitions may have high congestion levels, and may be unrouteable.

Additionally, in order to fully utilize chip area, conventional systems may run many trials using different bounding areas of the same IC design to provide a bounding area recommendation. A trial is the process of the selecting a proposed bounding area to place and route the IC design and determining precise regions within the proposed bounding area to place each cell of the IC design. The process further includes determining an exact path of each wire connecting the cells of the IC design within the proposed bounding area. The trial may include using complex and expensive electronic design automation (EDA) tools to verify the IC design is routable will meet manufacturing and performance requirement. In some instances, the trial may include fabricating the IC design to verify the IC design is routable and will meet manufacturing and performance requirements. Each trial may take a significant amount of time (e.g., hours, days, etc.) and may consume a large amount of computational resources. Furthermore, running trials to determine a bounding area may not be scalable with a large number of partitions and designs. The system may run many trials using many bounding areas of an IC design that may ultimately be determined to be congested (e.g., the measured congestion level exceeds a threshold congestion level) and unrouteable (e.g., the number of available routing tracks is less than the number of required routing tracks). Running many trials may consume a significant amount of computing resources (e.g., processing cycles, storage space, etc.). As a result, an overall efficiency of the system may decrease and an overall latency of the system may increase.

Aspects of the present disclosure address the above deficiencies by determining a congestion level for a bounding area of an IC design. In at least one embodiment, a machine learning model (e.g. a GCN) may be trained to predict congestion levels of one or more regions of an IC design based on given placement data for cells of the IC design. Placement data may indicate an initial placement location for each of the cells of the IC design. The system may generate a graph based on the identified placement data. Nodes of the graph may correspond to respective cells of an IC design and regions associated with the initial placement location. Each edge of the graph may correspond to a connection between two or more of the cells. In at least one embodiment, the system may generate the graph by mapping a first graph (e.g., a logic graph) to a second graph (e.g., a lattice graph). The system may generate the logic graph according to the IC design. Each node of the logic graph may correspond to at least one cell of the IC design. Each edge of the logic graph may represent a logical connection (e.g., a net) between two or more cells of the IC design. The system may generate the lattice graph based on the identified placement data. Each node of the lattice graph may represent a respective region of the IC design. Each edge of the lattice graph may represent a physical boundary between the nodes of the lattice graph. The system may generate the graph (e.g., a hyper logic graph) by mapping each node of the logic graph to corresponding nodes of the lattice graph. The corresponding nodes of the lattice graph are associated with the region of the IC design associated with the initial placement location for the nodes of the logic graph. In at least one embodiment, the system may utilize graph geometric embedding to represent connections between nodes of the logic graph and nodes of the lattice graph as vectors in a Euclidean space. In at least one embodiment, a graph attention convolution (GAT) block may perform the graph geometric embedding.

The system may provide the graph as input to a machine learning model. In at least one embodiment, the machine learning model may be a Graph Convolution Neural Network (GCN). The machine learning model may be trained to predict, based on a given graph associated with cells of an IC design, a congestion level for the cells of the IC design at one or more bounding areas. The system may obtain congestion data as an output from the machine learning model indicating the congestion level for a first bounding area of the IC design. In at least one embodiment, the congestion level may be a cell utilization level for the cells at the first bounding area or a wire utilization level for the wires at the first bounding area. The cell utilization level may be a percentage of the first bounding area occupied by the cells of the IC design. The wire utilization may be a percentage of the first bounding area available for routing of wires. Accordingly, the congestion level may indicate a prediction of the amount of space the IC design will utilize if placed and routed on a partition the size of the first bounding area.

The system may determine whether the indicated congestion level for a first bounding area of the IC design satisfies one or more congestion criteria. In at least one embodiment, the congestion criteria may include threshold congestion level according to the IC design. In at least one embodiment, the threshold level may be determined by historical data. Responsive to determining that the first bounding area falls below the threshold congestion level, the cells may be assigned according to the design for the partition of the IC design for installation at a region of the chip corresponding to the first bounding area. In at least one embodiment, the congestion data indicates a congestion level for each of one or more second bounding areas of the IC design. In at least one embodiment, the congestion criteria may include a requirement that the congestion level for the first bounding area be lower than the congestion level for each of the one or more second bounding areas. Responsive to this requirement to be satisfied, the cells of the IC design may be assigned for installation at the region of the chip corresponding to the first bounding area.

Aspects of the present disclosure address the deficiencies of conventional systems by providing a technique to predict congestion levels of an IC design constrained to a first bounding area using a machine learning model. The machine learning model may receive a graph based on placement data of the IC design as input. By accurately predicting a congestion level of the IC design within the bounding area, aspects of the present disclosure may determine whether to place and route IC design within the bounding area based on the congestion level. Accordingly, a placement and routing system operating according to some aspects of the present disclosure does not need to run many trials using different partition areas to place and route an IC design. In view of the above, the overall speed of such a placement and routing system may be high, and such a system may consume significantly fewer computing resources as compared to conventional placement and routing systems.

System Architecture

FIG. 1 is a block diagram of an example system architecture 100, according to at least one embodiment. The system architecture 100 (also referred to as "system" herein) includes computing device 102, data stores 112A-N (collectively and individually referred to as data store(s) 112), and server machine 130, server machine 140, and/or server machine 150. In implementations, network 110 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Computing device 102 may be a desktop computer, a laptop computer, a smartphone, a tablet computer, a server, or any suitable computing device capable of performing the techniques described herein. In at least one embodiment, computing device 102 may be a computing device of a cloud computing platform. For example, computing device 102 may be, or may be a component of, a server machine of a cloud computing platform. In such embodiments, computing device 102 may be coupled to one or more edge devices (not shown) via network 110. An edge device refers to a computing device that enables communication between computing devices at the boundary of two networks. For example, an edge device may be connected to computing device 102, data store 112, server machine 130, server machine 140, and/or server machine 150 via network 110, and may be connected to one or more endpoint devices (not shown) via another network. In such example, the edge device may enable communication between computing device 102, data store 112, server machine 130, server machine 140, and/or server machine 150 and the one or more client devices. In other or similar embodiments, computing device 102 may be, or may be a component of, an edge device. For example, computing device 102 may facilitate communication between data store 112, server machine 130, server machine 140, and/or server machine 150, which are connected to computing device 102 via network 110, and one or more client devices that are connected to computing device 102 via another network.

In still other or similar embodiments, computing device 102 may be, or may be a component of, an endpoint device. For example, computing device 102 may be, or may be a component of, devices, such as, but not limited to: televisions, smart phones, cellular telephones, data center servers, data processing units (DPUs), personal digital assistants (PDAs), portable media players, netbooks, laptop computers, electronic book readers, tablet computers, desktop computers, set-top boxes, gaming consoles, a computing device for an autonomous vehicles, a surveillance device, and the like. In such embodiments, computing device 102 may be connected to data store 112, server machine 130, server machine 140 and/or server machine 150 via network 110. In other or similar embodiments, computing device 102 may be connected to an edge device (not shown) of system 100 via a network and the edge device of system 100 may be connected to data store 112, server machine 130, server machine 140 and/or server machine 150 via network 110.

Computing device 102 may include a memory 104. Memory 104 may include one or more volatile and/or non-volatile memory devices that are configured to store data. Memory 104 may store IC design 105, placement data 106, input graph 107, and congestion data 108. Although IC design 105, placement data 106, input graph 107, and congestion data 108 may be stored at memory 104, it should be noted that IC design 105, placement data 106, input graph

107, and/or congestion data 108 may be stored at memory of another memory device associated with system 100 or another memory.

In at least one embodiment, computing device 102 may include a congestion prediction engine 151. Congestion prediction engine 151 is configured to determine a congestion level for a bounding area of an IC design. Congestion prediction engine 151 obtains placement data 106 associated with the IC design. In at least one embodiment, IC design 105 may be represented by a netlist indicating cells (e.g., memory cells or logic gates) connected via nets (e.g., wires) of the IC design. It should be noted that although implementations of the present disclosure are discussed in terms of cells (e.g., memory cells), implementations may also be generally applied to the basic building blocks of digital circuit design (e.g., Field Programmable Gate Array (FPGA) Look Up Tables (LUTs), logic gates, logic cells, memory cells, etc.). In at least one embodiment, IC design 105 may be a partition of an IC design for placement and routing on a very-large-scale integrated (VLSI) circuit. Placement data 106 indicates an initial placement location for each cell of IC design 105. The congestion prediction engine 151 may generate a hyper logic graph (e.g., input graph 107) based on the placement data 106. The nodes of the hyper logic graph correspond to cells of the IC design 105 and a region of the IC design 105. The edges of the hyper logic graph may correspond to connections between the cells, connections between regions of the IC design 105, or connections between cells and regions of the IC design 105. Accordingly, the hyper logic graph represents a relationship between IC design 105 and placement data 106. Congestion prediction engine 151 may provide the hyper logic graph (e.g., input graph 107) as input into a congestion prediction model (e.g., model 160). The output of the congestion prediction model is congestion data 108 that indicates a congestion level of a bounding are of the IC design. The bounding area may be a region of the IC design associated with the initial placement location of the cells of IC design 105. The system 100 may determine whether to install the cells at the region based on the congestion level. For example, responsive to determining the congestion level is below a threshold congestion level, the system 100 may decide the cells are to be installed at the region. further details regarding congestion prediction engine 151 are provided with respect to FIG. 3.

In some implementations, data store 112A-N is a persistent storage that is capable of storing content items (e.g., placement data) and data associated with the stored content items (e.g., graphs and congestion predictions) as well as data structures to tag, organize, and index the content items and/or the object data. Data store 112 may be hosted by one or more storage devices, such as main memory, magnetic or optical storage-based disks, tapes or hard drives, NAS, SAN, and so forth. In some implementations, data store 112 may be a network-attached file server, while in other embodiments, data store 112 may be some other type of persistent storage such as an object-oriented database, a relational database, and so forth, that may be hosted by computing 102 or one or more different machines coupled to the computing device 102 via network 110.

In some implementations, data store 112 is a persistent storage that is capable of storing data as well as data structures to tag, organize, and index the data. Data store 112 may be hosted by one or more storage devices, such as main memory, magnetic or optical storage based disks, tapes or hard drives, NAS, SAN, and so forth. In some implementations, data store 112 may be a network-attached file server, while in other embodiments data store 112 may be some other type of persistent storage such as an object-oriented database, a relational database, and so forth, that may be hosted by computing 102 or one or more different machines coupled to the computing device 102 via network 110.

In at least one embodiment, system 100 may include multiple data stores 112. In at least one embodiment, a first data store 112 may be configured to store data that is accessible only to computing device 102, server machine 130, server machine 140, and/or server machine 150. For example, computing device 102, server machine 130, server machine 140, and/or server machine 150 may only be able to access data store 112 via network 110, which may be a private network. In another example, data stored at data store 112 may be encrypted and may be accessible to computing device 102, server machine 130, server machine 140, and/or server machine 150 via an encryption mechanism (e.g., a private encryption key, etc.). In additional or alternative embodiments, a second data store 112 may be configured to store data that is accessible to any device that is accessible to data store 112 via any network. For example, data store 112B may be a publicly accessible data store that is accessible to any device via a public network. In additional or alternative embodiments, system 100 may include a data store 112 that is configured to store first data that is accessible only to computing device 102, server machine 130, server machine 140, and/or server machine 150 (e.g., via private network 110, via an encryption mechanism, etc.) and second data that is accessible to devices that are connected to data store via another network (e.g., a public network). In yet additional or alternative embodiments, system 100 may only include a single data store 112 that is configured to store data that is accessible only to computing device 102, server machine 130, server machine 140, and/or server machine 150 (e.g., via private network 110, via an encryption mechanism, etc.). In such embodiments, data store 112 may store data that is retrieved (e.g., by computing device 102, training data generator 131, training engine 141, etc.) from a publicly accessible data store.

Server machine 130 may include a training data generator 131 that is capable of generating training data to train ML models 160A-N. In at least one embodiment, the training data may include a set of training inputs and a set of target outputs. The set of training inputs may include one or more IC designs implemented according to corresponding placement data. In at least one embodiment, training data generator 131 may retrieve one or more IC designs and/or placement data from data store 112. The set of target outputs may include data associated with the one or IC designs and corresponding placement data of the set of training inputs. For example, the set of target outputs may include a congestion level associated with a respective IC design and placement data. In at least one embodiment, training data generator 131 may retrieve the data associated with the one or more IC designs of the set of training inputs from data store 112. Training data generator 131 may generate a mapping between the set of training inputs and the set of target outputs and provide the generated mapping as training data to training engine 141.

Server machine 140 may include a training engine 141. Training engine 141 may train a machine learning model 160A-N using the training data from training set generator 131. The machine learning model 160A-N may refer to the model artifact that is created by the training engine 141 using the training data that includes training inputs and corresponding target outputs (correct answers for respective training inputs). The training engine 141 may find patterns in the training data that map the training input to the target output (the answer to be predicted), and provide the machine learning model 160A-N that captures these patterns. The machine learning model 160A-N may be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model may be trained by, for example, adjusting weights of a neural network in accordance with a backpropagation learning algorithm or the like. For convenience, the remainder of this disclosure will refer to the implementation as a neural network, even though some implementations might employ an SVM, a GCN or other type of learning machine instead of, or in addition to, a neural network. In at least one embodiment, the training data may be generated by training data generator 131 hosted by server machine 130, as described above. Further details regarding training a congestion prediction model (e.g., model 160A-N) are provided with respect to FIG. 2.

Server 150 may include a congestion prediction engine 151 Congestion prediction engine 151 determines a congestion level for a bounding area of an IC design, as described above. Further details regarding congestion prediction engine 151 are provided with respect to FIG. 3.

In some implementations, computing device 102, data stores 112, and/or server machines 130-150, may be one or more computing devices computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable congestion prediction based on an IC design (e.g., IC design 105). It should be noted that in some other implementations, the functions of computing device 102, server machines 130, 140, and/or 150 may be provided by a fewer number of machines. For example, in some implementations server machines 130 and 140 may be integrated into a single machine, while in other implementations server machines 130, 140, and 150 may be integrated into multiple machines. In addition, in some implementations one or more of server machines 130, 140, and 150 may be integrated into computing device 102. In general, functions described in implementations as being performed by computing device 102 and/or or server machines 130, 140, 150 may also be performed on one or more edge devices (not shown) and/or client devices (not shown), if appropriate. In addition, the functionality attributed to a particular component may be performed by different or multiple components operating together. Computing device 102 and/or server machines 130, 140, 150 may also be accessed as a service provided to other systems or devices through appropriate application programming interfaces.

Figure 2:
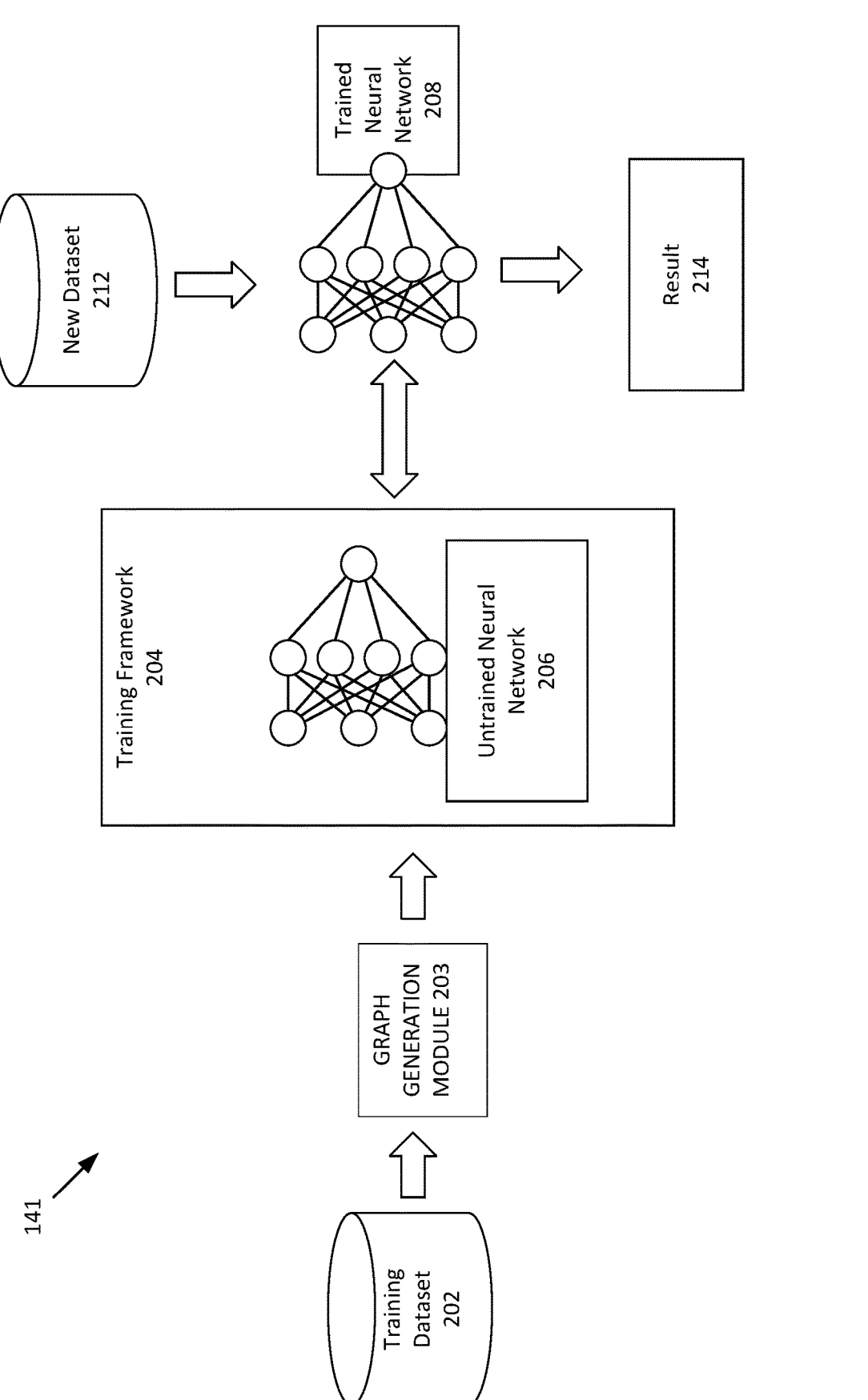
FIG. 2 illustrates an example training engine for training and deployment of a neural network, according to at least one embodiment.

FIG. 2 illustrates an example training engine 141 for training and deployment of a deep neural network, according to at least one embodiment. In at least one embodiment, untrained neural network 206 is trained using a training dataset 202. In at least one embodiment, training data generator 131 may be configured to generate training dataset 202 for input to a graph generator 203. In at least one embodiment, graph generator 203 may correspond to graph generator 330, described with respect to FIG. 3. Graph generator 203 may be configured to generate training graphs for input to training framework 204 for training a congestion prediction model (e.g., model 160A-N). As described previously, training data generator 131 may reside at a server machine, such as server machine 130 of FIG. 1, that is a part of or separate from computing device 102. Training engine 141 may reside at server machine 130 or another server machine, such as server machine 140, that is a part of or separate from computing device 102.

In at least one embodiment, training framework 204 is a PyTorch framework, whereas in other embodiments, training framework 204 is a TensorFlow, Boost, Caffe, Microsoft Cognitive Toolkit/CNTK, MXNet, Chainer, Keras, Deeplearning4j, or other training framework. In at least one embodiment, training framework 204 trains an untrained neural network 206 and enables it to be trained using processing resources described herein to generate a trained neural network 208. In at least one embodiment, weights may be chosen randomly or by pre-training using a deep neural network. In at least one embodiment, training may be performed in either a supervised, semi-supervised, or unsupervised manner. In at least one embodiment, training framework 204 may train an untrained neural network 206 using Mean Square Error (MSE) with a Adam gradient descent optimization algorithm.

In at least one embodiment, training dataset 202 may include one or more training IC designs, and for each training design, training placement data associated with the training design. In at least one embodiment, each training design may be a netlist associated with an IC design. The netlist may be textual description (e.g., a hardware description language (HDL)) that indicates the connections (e.g., wire, nets, etc.) and structure (e.g., cells) of training design. The textual description may be an HDL such as Verilog, very high-speed integrated circuit hardware descriptive language (VHDL), and the like. In at least one embodiment, training dataset 202 may be included in a collection of IC designs that may be used to train neural network models described herein. For example, training data 202 may be included in a collection of publicly accessible IC designs that may be retrieved from a publicly accessible data store (e.g., data store 112), or a publicly accessible portion of a data store and used to train a congestion prediction model. In at least one embodiment, each of the collection of designs may be associated with training placement data, which may also be included at the publicly accessible data store or the publicly accessible portion of a data store. In at least one embodiment, each of the collection of designs and the placement data associated with each of the collection of designs may be provided by one or more users of a congestion prediction platform. For example, a user of the congestion prediction platform may provide (i.e., via a respective client device associated with the user) an IC design. The user may also provide (i.e., via a graphical user interface of the respective client device) an indication of placement data associated with the IC design. In another example, a first user of the congestion prediction platform may provide (i.e., via a first client device associated with the first user) an IC design and a second user may provide (i.e., via a graphical user interface of a second client device associated with the second user) an indication of placement data corresponding to the IC design provided by the first user.

In at least one embodiment, training data set 202 may include additional features associated with one or more training designs. The additional features may include cell-level features, grid-level features, and design-level features of a training design. Cell-level features may include features for each cell of IC design 105. For example, cell-level features may include cell area, number of input pins, number of output pins, number of connected edges, and cell type. Design-level features may be features associated with the training design. For example, design-level features may include a standard cell utilization, total macro areas, rectilinear boundaries area (e.g., the bounding area), and Half-Perimeter wire length (HPWL). Grid-level features may include features associated with the IC design according to a bounding area and placement data. For example, grid-level features may include cell density, cell count, pin count, and a preliminary congestion indicator.

Graph generator 203 is configured to generate training graphs (e.g., a hyper logic graph) based on training dataset 202 (e.g., a set of IC designs and corresponding placement data) for input into training framework 204. Training graphs generated by graph generator 203 may include, for example, input graph 410 of FIG. 4. A training graph may include a hyper logic graph associated with cells of a prior IC design (e.g., training dataset 202). One or more nodes of the training graph correspond to a cell and region of the prior IC design according to training dataset 202. Edges of the graph correspond to a connection between two or more cells according to the prior IC design, a connection between regions of the prior IC design, or a connection between a cell of the prior IC design and a region of the prior IC design. In at least one embodiment, graph generator 203 may generate input graphs with associated target outputs to train untrained neural network 206. A target output includes an indication of a congestion level for a prior bounding area of the prior IC design. The prior bounding area includes at least one region, of the prior IC design, including one or more cells of the prior IC design. Training framework 204 may create trained neural network 208 that is a graph neural network. In at least one embodiment, trained neural network 208 may be a graph neural network. In similar embodiments, trained neural network 208 may be a graph convolution network (GCN).

In at least one embodiment, untrained neural network 206 is trained using supervised learning, wherein graph generator 203 may provide an input paired with a desired output for an input, or where graph generator 203 includes input having a known output and an output of neural network 206 is manually graded. In at least one embodiment, untrained neural network 206 is trained in a supervised manner and processes inputs from graph generator 203 based on training dataset 202 and compares resulting outputs against a set of expected or desired outputs. In at least one embodiment, errors are then propagated back through untrained neural network 206. In at least one embodiment, training framework 204 adjusts weights that control untrained neural network 206. In at least one embodiment, training framework 204 includes tools to monitor how well untrained neural network 206 is converging towards a model, such as trained neural network 208, suitable to generating correct answers, such as in result 214, based on input data such as a new dataset 212. In at least one embodiment, training framework 204 trains untrained neural network 206 repeatedly while adjusting weights to refine an output of untrained neural network 206 using a loss function and adjustment algorithm, such as stochastic gradient descent. In at least one embodiment, training framework 204 trains untrained neural network 206 until untrained neural network 206 achieves a desired accuracy. In at least one embodiment, trained neural network 208 may then be deployed to implement any number of machine learning operations.

In at least one embodiment, untrained neural network 206 is trained using unsupervised learning, wherein untrained neural network 206 attempts to train itself using unlabeled data. In at least one embodiment, unsupervised learning training dataset 202 will include input data without any associated output data or "ground truth" data. In at least one embodiment, untrained neural network 206 may learn groupings within training dataset 202 and may determine how individual inputs are related to untrained dataset 202. In at least one embodiment, unsupervised training may be used to generate a self-organizing map in trained neural network 208 capable of performing operations useful in reducing dimensionality of new dataset 212. In at least one embodiment, unsupervised training may also be used to perform anomaly detection, which allows identification of data points in new dataset 212 that deviate from normal patterns of new dataset 212.

In at least one embodiment, semi-supervised learning may be used, which is a technique in which in training dataset 202 includes a mix of labeled and unlabeled data. In at least one embodiment, training framework 204 may be used to perform incremental learning, such as through transferred learning techniques. In at least one embodiment, incremental learning enables trained neural network 208 to adapt to new dataset 212 without forgetting knowledge instilled within trained neural network 208 during initial training.

Figure 3:
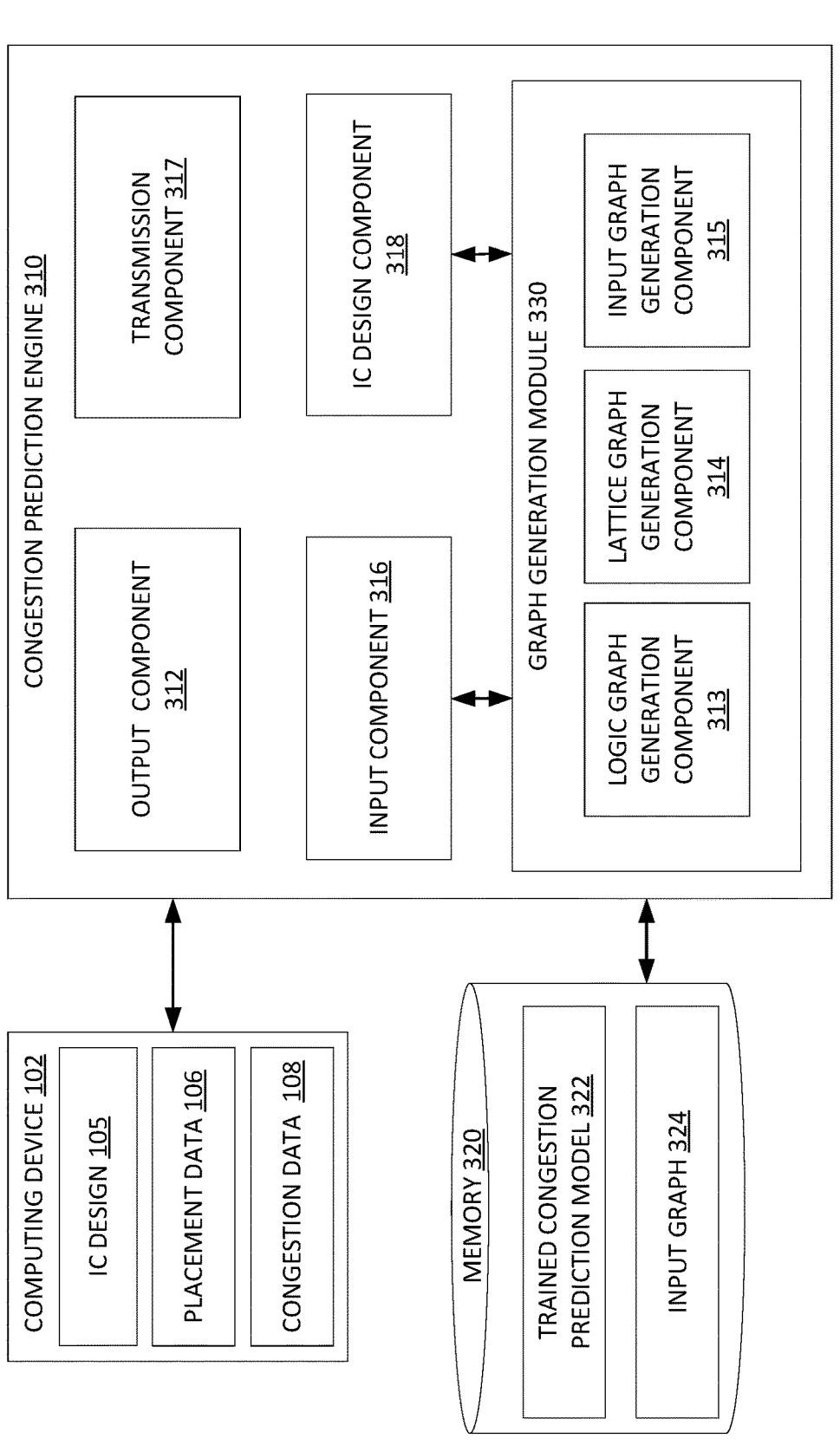
FIG. 3 is a block diagram of an example congestion prediction engine, according to at least one embodiment.

FIG. 3. is a block diagram of an example congestion prediction engine, according to at least one embodiment. congestion prediction engine 310 may include an output component 312, a transmission component 317, a input component 316, an IC design component 318, and a graph generator 330. In at least one embodiment, congestion prediction engine 310 may reside at computing device 102. In such embodiments, memory 220 may correspond to memory 104 described with respect to FIG. 1. In at least one embodiment, congestion prediction engine 310 may reside at server 150. In such embodiments, memory 320 may correspond to memory at a data store (e.g., data store 112), memory 104, or memory of another memory device associated with system 100. In at least one embodiment, graph generator 330 may include a logic graph generation component 313, a lattice graph generation component 314, and an input graph generation component 315.

Input component 316 may be configured to obtain an IC design (e.g., IC design 105) and corresponding placement data (e.g., placement data 106). Input component 316 may provide the obtained IC design and corresponding placement data to graph generator 330. In at least one embodiment, the obtained IC design may include a netlist associated with IC design 105. The netlist may be textual description (e.g., a hardware description language (HDL)) that indicates the connections (e.g., wire, nets, etc.) and structure (e.g., cells) of the obtained IC design, as described above. The obtained placement data may indicate an initial placement location for each cell of the obtained IC design 105 within a first bounding area. The respective regions within the first bounding area of the IC design may be an approximate location for placement and routing of the obtained IC design 105. In at least one embodiment, input component 316 many generate placement data 106 using an additional machine learning model. The additional machine learning model may be trained to predict a preliminary placement location for each cell of the IC design. The additional model may determine the preliminary placement location for an IC design by determining locations of cells of the IC design such that a total wirelength is minimized and there is no overlap between cells. The wirelength is an indication of the amount of metal needed to connect cells of the IC design. Input component 316 may obtain an output from the additional machine learning model and extract placement data 106 from the output.

IC design component 318 may provide IC design 105 to graph generator 330. Logic graph generation component 313 may generate a logic graph based on IC design 105 and corresponding placement data 106. In at least one embodiment, the generated logic graph may include, for example, logic graph 402 of FIG. 4. Each cell of the logic graph may correspond to a cell of the IC design 105. Each edge of the logic graph may represent a logical connection between two or more cells of the IC design. Lattice graph generation component 314 may generate a lattice graph based on placement data 106. Each node of the lattice graph may represent a respective region of the IC design. Each edge of the lattice graph may represent a physical boundary between nodes of the lattice graph. In at least one embodiment, the generated lattice graph may include, for example, lattice graph 404 of FIG. 4.

Input graph generation component 315 may generate input graph 324 (also referred to as "hyper logic graph" herein) for input into a congestion prediction model (e.g., trained congestion prediction model 322) based on the logic graph generated by logic graph generation component 313 and the lattice graph generated by lattice graph generation component 314. In at least one embodiment, the input graph 324 generated by input graph generation component 315 may include, for example, input graph 410 of FIG. 4. Graph generator 330 may be configured to provide the input graph to input component 316.

Input component 316 may be configured to provide the obtained input graph 324 as input to trained congestion prediction model 322 stored at memory 320. In at least one embodiment, trained congestion prediction model 322 may correspond to a machine learning model that is trained by training engine 141 using data generated by training data generator 131. as described with respect to FIG. 1. and FIG. 2. In at least one embodiment, trained congestion prediction model 322 may correspond to another trained congestion prediction model that is not trained by training engine 141 using data generated by data generator 131.

In at least one embodiment, input component 316 may be configured to obtain certain cell-level features, grid-level features, and design-level features for input to trained congestion prediction model 322. In at least one embodiment, input component 316 may generate the cell-level features, grid-level features, and design-level features based on IC design 105 and placement data 106. The cell-level features may include features for each cell of IC design 105. Cell-level features may include cell area, number of input pins, number of output pins, number of connected edges, and cell type. In at least one embodiment, design-level features may be features associated with the generated input graph 324. For example, design-level features may include a standard cell utilization, total macro areas, rectilinear boundaries area (e.g., the bounding area), and Half-Perimeter wire length (HPWL). Grid-level features may include features associated with the IC design according to a bounding area and placement data. For example, grid-level features may include cell density, cell count, pin count, and a preliminary congestion indicator.

In at least one embodiment, input component 316 may provide cell-level features, grid-level features, and design-level features associated with IC design 105 as input to trained congestion prediction model 322. Input component 316 may map the identified cell-level features, grid-level features, and design-level features to input graph 324 prior to providing input graph 324 as input to trained congestion prediction model 322. In at least one embodiment, input component 316 may provide one or more of cell-level features, grid-level features, or design-level features with input graph 324 as input to congestion prediction model 322.

Congestion prediction model 322 may be further trained to predict a congestion level of IC design 105 based on one or more of cell-level features, grid-level features, or design-level features.

Responsive to input component 316 receiving input graph 324 from graph generator 330, input component 316 may provide input graph 324 as input to trained congestion prediction model 322. Output component 312 may obtain one or more outputs of trained congestion prediction model 322 responsive to input component 316 providing input graph 324 as input to trained congestion prediction model 322. The one or more obtained outputs may include congestion data 108 indicating a threshold congestion level for a first bounding area of the IC design. The threshold congestion level may indicate a relationship between a congestion level (e.g., the output of training congestion prediction model 322), and the routability of IC design 105 according to placement data 106 (e.g., placement of an IC design according to the first bounding area). The threshold congestion level may indicate a critical congestion level associated with the input graph according to IC design 105 and placement data 106. In at least one embodiment, the critical congestion level may be reached when the number of routing tracks available for routing within a given area (e.g. the bounding area) is less than the number necessary to route the IC design 105. As such, cell area, cell area, pin density, and the like may affect congestion and, therefore, routability of IC design 105. In at least one embodiment, the threshold congestion level may be determined by historical data. Historical data may include VLSI design rule checking (DRC). DRC may include rules for determining whether a given IC design meets certain manufacturing requirements such that fabrication of the IC design will not result in chip failure. For example, DRC may include a minimum allowable number of shorting and/or spacing DRC violations within a certain area. A shorting DRC violation occurs when two or more nets of the same layer cross each other, creating a short between the two nets. Spacing DRCs define a minimum allowable amount of space between two or more cells of an IC design. Designs with more than the allowable number of DRC violations within the certain area may be marked as unrouteable.

In at least one embodiment, trained congestion prediction model 322 may be trained to predict a congestion level for thick metal (TM) layers of the respective IC design. TM layers are thicker and faster than standard wires used to route to the IC design. TM layers may be used to connect cells of an IC design that have timing constraints associated with routing the IC design. Timing constraints are used such that IC design, once fabricated, may operate at a clock frequency associated with the IC. Accordingly, timing critical paths of the IC design may use more routing resources on TM layers. Trained congestion prediction model 322 may be additionally trained to predict a congestion level associated with TM layers of the IC design.

In at least one embodiment, output component 312 may determine that a congestion level for a first bounding area of IC design 105 satisfies one or more congestion criteria. In at least one embodiment, congestion criteria may include the threshold confidence level described above. Responsive to determining that the congestion level for the first bounding area falls below the threshold congestion level, output component 312 may designate cells of IC design 105 for installation at a region of IC design 105 corresponding to the first bounding area. In at least one embodiment, congestion data 108 may include one or more second bounding areas and associated congestion levels for the one or more second bounding areas of IC design 105. Responsive to determining that the congestion level for the first bounding area is lower than the congestion level for each of the one or more second bounding areas, output component 312 may designate cells of IC design 105 for installation at a region of IC design 105 corresponding to the first bounding area. Responsive to determining that the congestion level for one of the second bounding areas is lower than the congestion level for the first bounding area, output component 312 may designate cells of IC design 105 for installation at a region of IC design 105 corresponding to one of the second bounding areas.

In at least one embodiment, the output of trained congestion prediction model 322 may include congestion data 108 indicating a congestion level associated with input graph 324 and a corresponding level of confidence of the accuracy of the congestion level. Output component 312 may determine that a particular congestion level corresponds to the input graph by determining that a level of confidence associated with congestion prediction satisfies a level of confidence criterion (e.g., the level of confidence exceeds a threshold value, etc.). In additional or alternative embodiments, the output of trained congestion prediction model 322 may include an indication of a level of confidence of the congestion level.

In at least one embodiment, transmission component 317 of congestion prediction engine 310 may transmit congestion data 108 and/or an indication that one or more congestion criteria are satisfied to computing device 102 (e.g., via a network, network 110, or a BUS of computing device 102).

FIG. 4 depicts an example graph generator for generating an input graph as input to a congestion prediction model, according to at least one embodiment. In at least one embodiment, input graph 410 may be generated using IC design 105 and its associated placement data 106. In at least one embodiment, graph generation operations performed with respect to FIG. 4 may correspond to graph generator 330, described with respect to FIG. 3., and graph generator 203, described with respect to FIG. 2.

Logic graph 402 may be generated based on an identified IC design (e.g., IC design 105). In at least one embodiment, each node of the logic graph 402 may correspond to a cell of IC design 105. Each edge of logic graph 402 may correspond to a logical connection between two or more cells of IC design 105. In at least one embodiment, IC design 105 may include a netlist of cells and corresponding cell connections (e.g., nets, wire, etc.), as described above. In such an embodiment, each node of logic graph 402 may correspond to a cell of a netlist corresponding to IC design 105. Each edge of logic graph 402 may correspond to a net of the netlist corresponding to IC design 105. In similar embodiments, each node of logic graph 402 may be associated with its respective library base name according to a standard cell library corresponding to IC design 105. The standard cell library may include, without limitation, basic universal cells/gates (e.g., NAND, XOR, NOT, etc.), combinational logic cells/gates (e.g., MUX, AOI, etc.), clock cells, flip flops, and the like.

Lattice graph 404 may be generated based on identified placement data (e.g., placement data 106). Lattice graph 404 may include a grid of nodes. Each node of lattice graph 404 may correspond to a respective region of the IC design. Each edge of lattice graph 404 may correspond to a physical boundary between nodes of the lattice graph 404. In at least one embodiment, lattice graph 404 is a rectangular region in Cartesian coordinate system. Each node may correspond to a Cartesian coordinate in a placement map of IC design 105 according to placement data 106.

Input graph 410 (also referred to as "hyper logic graph 410" herein) may be generated using logic graph 402 and lattice graph 404 by mapping nodes of the lattice graph 404 to one or more nodes of the logic graph 402 according to IC design 105 and corresponding placement data 106. In at least one embodiment, input graph 410 may be generated by input graph generation component 315 and correspond to input graph 324 as described above with respect to FIG. 3. Input graph 410 may be used as input to an IC design congestion prediction model (e.g., model 160).

In at least one embodiment, features of cells associated with nodes of input graph 410 may be used as input to the IC design congestion prediction model in addition to input graph 410. In similar embodiments, three types of features may be used: cell-level features, grid-level features, and design-level features. Cell-level features may include features associated with each cell such as cell area, number of input pins, number of output pins, number of connected edges, cell type, etc. grid-level features may include features associated with lattice graph 404. Such features may include cell density, cell count, pin count, and a preliminary congestion indicator. Design-level features may include macro information of a corresponding IC design (e.g., IC design 105). Design-level features may include standard cell utilization, total macro areas, total standard cell areas, rectilinear boundaries area (referred to as "bounding area" herein), and a half-perimeter wire length indicator. In at least one embodiment, cell-level features, grid-level features, design-level features, and input graph 410 may be aggregated to form vectors for each node of input graph 410. Accordingly, input graph 410 may be a graph of per-node vectors for input into a congestion prediction engine (e.g., trained congestion prediction model 322).

Figure 5:
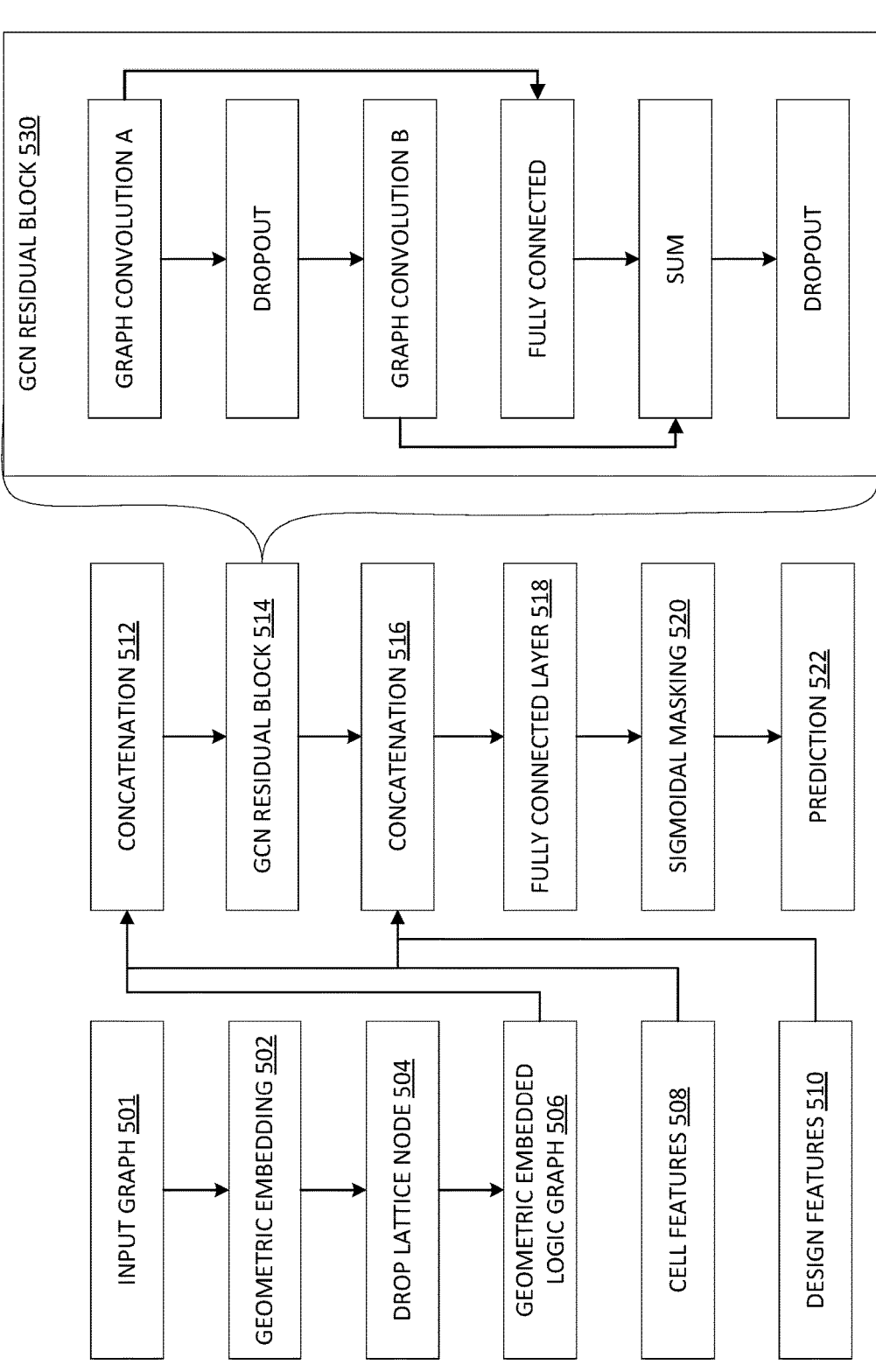
FIG. 5 depicts a block diagram of an example trained congestion prediction model, according to at least one embodiment.

FIG. 5 depicts a block diagram of an example trained congestion prediction model, according to at least one embodiment. Specifically, FIG. 5 depicts an example trained GCN, according to at least one embodiment. At operation 501, an input graph is received. The input graph received at operation 501 may be input graph 107 described with respect to FIG. 1, input graph 324 described with respect to FIG. 3, and/or input graph 410 described with respect to FIG. 4.

At operation 502, geometric embedding is performed on input graph 401 to transform input graph 401 into per-node vectors. The geometric embedding operation 502 may associate features of nodes of a lattice graph (e.g., lattice graph 404) with corresponding nodes of a logic graph (e.g., logic graph 402.) to create geometric embedded logic graph 506. Features associated with the nodes of the lattice graph may include grid-level features according to the identified placement data (e.g., placement data 106). Grid-level features may include cell density, cell count, pin count, and a preliminary congestion indication. In at least one embodiment, the embedding operation 502 may be performed by a graph attention convolution (GAT) geometrical embedding block. The GAT geometrical embedding structure may include one embedding layer and two multi-head GAT layers. The GAT block may weigh messages from neighbors (e.g., connected nodes) and control information flow through weighted aggregation. In such an embodiment, the GAT layer may discriminate nodes of the lattice graph from nodes of the logic graph to perform the geometric embedding operation. The output of the geometric embedding operation 502 may be a matrix that contains geometric information (e.g., physical location of cells) and learnt features of cells nodes.

At operation 504, lattice nodes and associated connections are dropped from input graph (e.g., input graph 410) because information associated with the lattice nodes was associated with nodes of the logic graph at operation 502 to create geometric embedded logic graph 506.

At operation 512, cell features 508 are concatenated with the geometric embedded logic graph 506. Cell features 508 may include information associated with each cell of the logic graph. In at least one embodiment, cell features 508 may include cell area, number of input pins, number of output pins, number of connected edges, and cell type.

At operation 514, cell features 508 are concatenated with the geometric embedded logic graph 506 and provided as input to GCN residual block 530. GCN residual block 530 may include two layers of convolution, skip connections, and two levels of dropouts, as illustrated. In at least one embodiment, there may be twelve GCN residual blocks. Operation 514 may generate per-cell information vectors.

At operation 516, the per-cell information vectors generated at operation 514 are concatenated with cell features 508 and design features 510.

At operation 518, the output of operation 516 is distilled into an N×1 vector, where N is the number of nodes of the logic graph. Operation 516 is performed by a fully connected layer of the GCN model.

At operation 520, the N×1 vector generated at operation 518 is provided as input to a sigmoidal transformation function. In at least one embodiment, the operation 518 may map the N×1 vector generated at operation 518 to a real number between zero one that represents a congestion level of an IC design associated with the input graph.

At operation 522, the GCN congestion prediction model provides the number generated at operation 520 as output.

FIG. 6 illustrates a flow diagram of an example method 600 of using a machine learning model that is trained to provide a congestion prediction of an IC design, according to at least one embodiment. The method 600 may be performed by processing logic that may include hardware (e.g., a processing device, circuitry, dedicated logic, microcode, hardware of a device, integrated circuit, etc.), software (e.g., instructions running or executing on a processing device), or a combination thereof. In at least one embodiment, the method 600 may be performed by a non-transitory computer-readable storage medium comprising instructions that, responsive to execution by a processor, cause the processor of a computing system to perform method 600. In at least one embodiment, one or more operations of method 600 may be performed by one or more components of congestion prediction engine 151, described herein. Although shown in a particular sequence or order, unless otherwise specified, the order of the operations may be modified. Thus, the illustrated embodiments should be understood only as examples, and the illustrated operations may be performed in a different order, and some operations may be performed in parallel. Additionally, one or more operations may be omitted in various embodiments. Thus, not all operations are required in every embodiment.

At block 602, processing units performing method 600 identify placement data associated with cells of an IC design. The placement data indicates an initial placement location for each of the cells of the IC design. In at least one embodiment, processing units may provide an indication of cells as input to an additional machine learning model. The additional machine learning model is trained to predict, based on an indication of one or more cells for inclusion in a respective IC design, a preliminary placement location for each of the one or more cells according to one or more IC design techniques. Processing units may obtain one or more outputs of the additional machine learning model and extract, from the one or more outputs of the additional machine learning model, the placement data associated with the cells of the IC design.

At block 604, processing units performing method 600 generate a graph (e.g., a hyper logic graph) based on the identified placement data. one or more nodes of the graph corresponds to a respective cell and a region, of the IC design, associated with the initial placement location for the respective cell. One or more edges of the graph correspond to a connection between two or more of the cells, a connection between two or more regions, or a connection between a cell and a region. In at least one embodiment, processing units may generate the graph based on the identified placement data by generating one or more first nodes and one or more first edges of the graph. Each of the one or more first nodes represent at least one of the cells. Each of the one or more first edges represent a logic connection between two or more respective cells, according to the identified placement data. Processing units may generate one or more second nodes and one or more second edge. Each of the one or more second nodes represent a respective region of the IC design. Each of the one or more second edges represent a physical boundary between at least one node of the one or more second nodes and an adjacent node of the one or more second nodes. Processing units may update a mapping between at least one of the one or more first nodes and a corresponding node of the one or more second nodes. The corresponding node is associated with the region of the IC design associated with the initial placement location for the at least one of the one or more first nodes.

At block 606, processing units performing method 600 provide the graph as input to a machine learning model. The machine learning model is trained to predict, based on a given graph associated with cell according to a respective IC design, a congestion level for cells at one or more bounding areas of the respective IC design. In at least one embodiment, the machine learning model may be a graph convolution neural network model (GCN). In at least one embodiment, processing units may provide data associated with at least one of cell-level features, grid-level features, or design-level features of the IC design with the graph as input to the machine learning model. The machine learning model is further trained to predict the congestion level for one or more bounding areas of the respective IC design based on at least one of given cell-level feature data, given grid-level feature data, or given design-level feature data.

At block 608, processing units performing method 600 obtain one or more outputs of the machine learning model. The one or more outputs include congestion data indicating a congestion level for a first bounding area, of the IC design, associated with the initial placement location of one or more of the cells. In at least one embodiment, the indicated congestion level may include at least one of a cell utilization level for the cells at the first bounding area or a wire utilization level for wires connecting the cells at the first bounding area. The at least one of the cell utilization level or the wire utilization level corresponds to a percentage of the first bounding area utilized by the cells and the wires during a particular time period. In at least one embodiment, the congestion data further indicates a respective congestion level for each of one or more second bounding areas of the IC design. In at least one embodiment, determining that the indicated congestion level for the first bounding area satisfies the one or more congestion criteria includes determining, at least one of: the indicated congestion level for the first bounding area falls below a threshold congestion level, or the indicated congestion level for the first bounding area is lower than the respective congestion level for each of the one or more second bounding areas.

At block 610, processing units performing method 600, responsive to determining that the indicated congestion level for the first bounding area satisfies one or more congestion criteria, designate the cells for installation at the at least one region, of the IC design, corresponding to the first bounding area.

FIG. 7 is a flow chart of a method 700 for training a machine learning model (e.g., machine learning model 160, etc.), according to aspects of the present disclosure. Method 700 is performed by processing logic that may include hardware (circuitry, dedicated logic, etc.), software (such as is run on a general purpose computer system or a dedicated machine), firmware, or some combination thereof. In one implementation, method 700 may be performed by one or more components of a system architecture, such as system architecture 100 of FIG. 1. In other or similar implementations, one or more operations of method 700 may be performed by one or more other machines not depicted in the figures. In some aspects, one or more operations of method 700 may be performed by training engine 141 of server machine 140. In other or similar aspects, one or more operations of method 700 may be performed by training data generator 131 of server machine 130.

For simplicity of explanation, the methods are depicted and described as a series of acts. However, acts in accordance with this disclosure may occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 710, processing logic initializes a training set T to an empty set (e.g., { }). At block 712, processing logic generates a training input including a graph associated with cells of a prior IC. One or more nodes of the graph correspond to a respective cell and region of the prior IC design that included the respective cell. One or more edges of the graph correspond to a connection between two or more of the cells according to the prior IC design. In at least one embodiment, the prior IC design is a historical IC design associated with historical placement data collected before, during, or after fabrication of the historical IC design. In at least one embodiment, the training input further includes data associated with at least one of cell-level features, grid-level features, or design-level features of the prior IC design. In at least one embodiment, the data associated with the cell-level features, grid-level features, or design level features is historical data associated with the prior IC design.

At block 714, the processing device generates a target output base on an indication of a congestion level for a prior bounding area of the prior IC design. The prior bounding area includes at least one region, of the prior IC design, including one or more of the cells. In at least one embodiment, the target output includes an indication of a respective congestion level for each of one or more additional prior bounding areas of at least one of the prior IC design or another prior IC design. In at least one embodiment, the indicated congestion level for the prior bounding area includes at least one of a cell utilization level for the cells at the prior bounding area or a wire utilization level for wires connecting the cells at the prior bounding area. The at least one of the cell utilization level or the wire utilization level corresponds to a percentage of the prior bounding area utilized by the cells and the wires during a particular time period. In at least one embodiment, the indicated congestion level is determined based on signal traffic measured for an IC fabricated according to the prior IC design.

At block 716, processing logic generates a mapping between the first training data and the second training data. At block 718, processing logic adds the mapping to training set T. At block 720, processing logic determines whether the training set T includes a sufficient amount of training data to train a machine learning model. It should be noted that in some implementations. the sufficiency of training set T may be determined based simply on the number of mappings in the training set, while in some other implementations, the sufficiency of training set T may be determined based on one or more other criteria (e.g., a measure of diversity of the training examples, etc.) in addition to, or instead of, the number of input/output mappings. Responsive to determining the training set does not include a sufficient amount of training data to train the machine learning model, method 700 returns to block 712. Responsive to determining the training set, T, includes a sufficient amount of training data to train the machine learning model, method 700 continues to block 722.

At block 722, processing logic provides training set T to train the machine learning model. The training T including a of generated training inputs mapped to a set of generated target outputs. In one implementation, the training set T is provided to training engine 141 of server machine 140 to perform the training. In the case of a neural network, for example, input values of a given input/output mapping are input to the neural network, and output values of the input/output mapping are stored in the output nodes of the neural network. The connection weights in the neural network are then adjusted in accordance with a learning algorithm (e.g., backpropagation, etc.), and the procedure is repeated for the other input/output mappings in the training set T. After block 722, machine learning model 160 may be used to predict, based on a given graph associated with cells according to a respective IC design, a congestion level for cells at one or more bounding areas of a respective IC design, in accordance with embodiments described above.

Inference and Training Logic

Figure 8A:
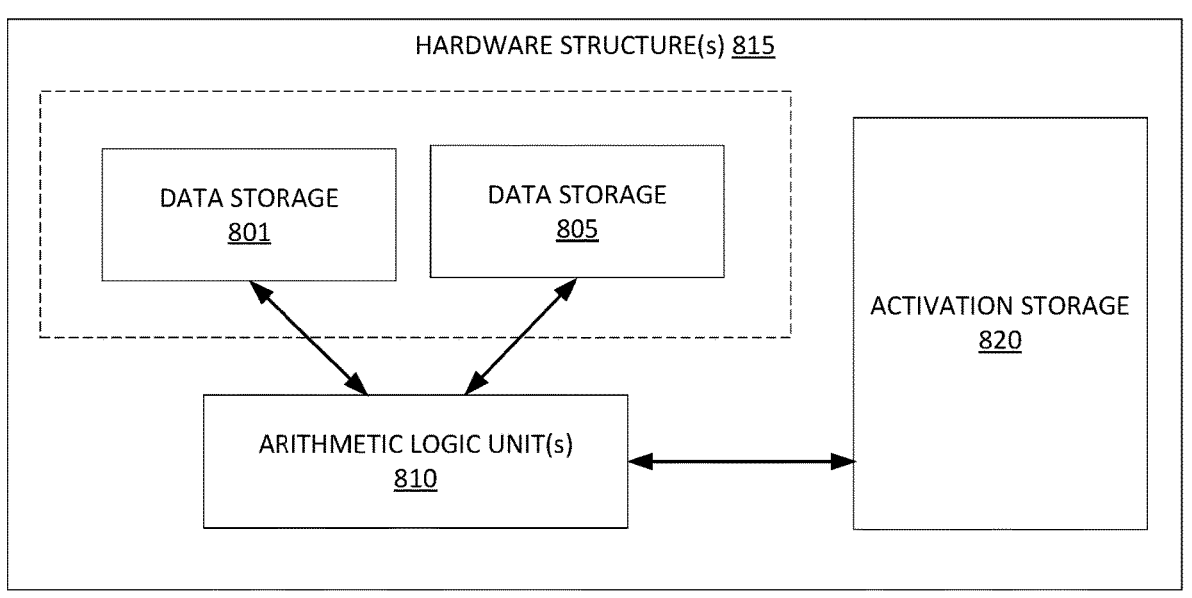
FIG. 8A illustrates inference and/or training logic, according to at least one embodiment.

FIG. 8A illustrates inference and/or training logic 815 used to perform inferencing and/or training operations associated with one or more embodiments. Details regarding inference and/or training logic 815 are provided below in conjunction with FIGS. 8A and/or 8B.

In at least one embodiment, inference and/or training logic 815 may include, without limitation, code and/or data storage 801 to store forward and/or output weight and/or input/output data, and/or other parameters to configure neurons or layers of a neural network trained and/or used for inferencing in aspects of one or more embodiments. In at least one embodiment, training logic 815 may include, or be coupled to code and/or data storage 801 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 801 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 801 may be included with other on-chip or off-chip data storage, including a processor's L1, L2, or L3 cache or system memory.

In at least one embodiment, any portion of code and/or data storage 801 may be internal or external to one or more processors or other hardware logic devices or circuits. In at least one embodiment, code and/or code and/or data storage 801 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 801 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 815 may include, without limitation, a code and/or data storage 805 to store backward and/or output weight and/or input/output data corresponding to neurons or layers of a neural network trained and/or used for inferencing in aspects of one or more embodiments. In at least one embodiment, code and/or data storage 805 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 815 may include, or be coupled to code and/or data storage 805 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 805 may be included with other on-chip or off-chip data storage, including a processor's L1, L2, or L3 cache or system memory. In at least one embodiment, any portion of code and/or data storage 805 may be internal or external to on one or more processors or other hardware logic devices or circuits. In at least one embodiment, code and/or data storage 805 may be cache memory, DRAM, SRAM, non-volatile memory (e.g., Flash memory), or other storage. In at least one embodiment, choice of whether code and/or data storage 805 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 801 and code and/or data storage 805 may be separate storage structures. In at least one embodiment, code and/or data storage 801 and code and/or data storage 805 may be same storage structure. In at least one embodiment, code and/or data storage 801 and code and/or data storage 805 may be partially same storage structure and partially separate storage structures. In at least one embodiment, any portion of code and/or data storage 801 and code and/or data storage 805 may be included with other on-chip or off-chip data storage, including a processor's L1, L2, or L3 cache or system memory.

In at least one embodiment, inference and/or training logic 815 may include, without limitation, one or more arithmetic logic unit(s) ("ALU(s)") 810, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 820 that are functions of input/output and/or weight parameter data stored in code and/or data storage 801 and/or code and/or data storage 805. In at least one embodiment, activations stored in activation storage 820 are generated according to linear algebraic and or matrix-based mathematics performed by ALU(s) 810 in response to performing instructions or other code, wherein weight values stored in code and/or data storage 805 and/or code and/or data storage 801 are used as operands along with other values, such as bias values, gradient information, momentum values, or other parameters or hyperparameters, any or all of which may be stored in code and/or data storage 805 or code and/or data storage 801 or another storage on or off-chip.

In at least one embodiment, ALU(s) 810 are included within one or more processors or other hardware logic devices or circuits, whereas in another embodiment, ALU(s) 810 may be external to a processor or other hardware logic device or circuit that uses them (e.g., a co-processor). In at least one embodiment, ALUs 810 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 801, code and/or data storage 805, and activation storage 820 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 820 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 820 may be cache memory, DRAM, SRAM, non-volatile memory (e.g., Flash memory), or other storage. In at least one embodiment, activation storage 820 may be completely or partially within or external to one or more processors or other logical circuits. In at least one embodiment, choice of whether activation storage 820 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 815 illustrated in FIG. 8A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8A may be used in conjunction with central processing unit ("CPU") hardware, graphics processing unit ("GPU") hardware or other hardware, such as field programmable gate arrays ("FPGAs").

Figure 8B:
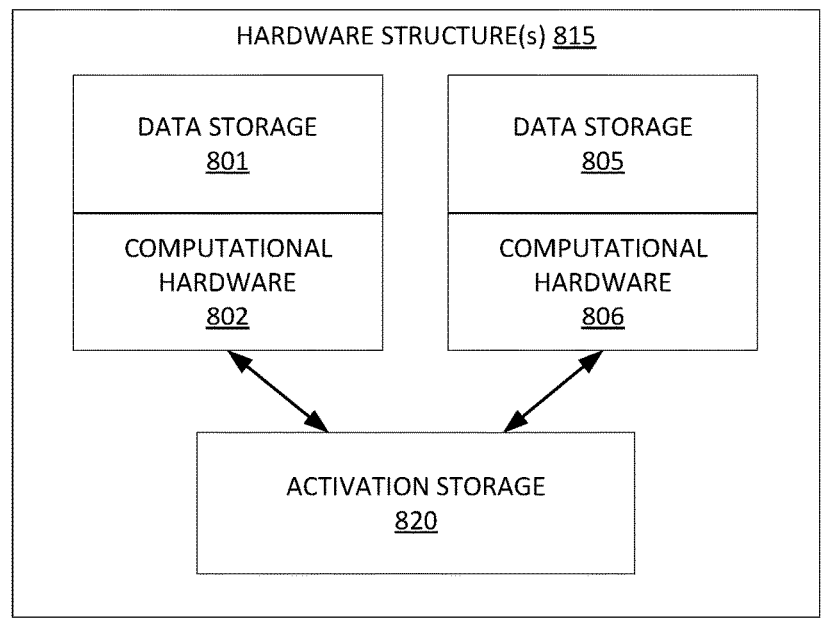
FIG. 8B illustrates inference and/or training logic, according to at least one embodiment.

FIG. 8B illustrates inference and/or training logic 815, according to at least one or more embodiments. In at least one embodiment, inference and/or training logic 815 may include, without limitation, hardware logic in which computational resources are dedicated or otherwise exclusively used in conjunction with weight values or other information corresponding to one or more layers of neurons within a neural network. In at least one embodiment, inference and/or training logic 815 illustrated in FIG. 8B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8B may be used in conjunction with central processing unit (CPU) hardware, graphics processing unit (GPU) hardware or other hardware, such as field programmable gate arrays (FPGAs). In at least one embodiment, inference and/or training logic 815 includes, without limitation, code and/or data storage 801 and code and/or data storage 805, which may be used to store code (e.g., graph code), weight values and/or other information, including bias values, gradient information, momentum values, and/or other parameter or hyperparameter information. In at least one embodiment illustrated in FIG. 8B, each of code and/or data storage 801 and code and/or data storage 805 is associated with a dedicated computational resource, such as computational hardware 802 and computational hardware 806, respectively. In at least one embodiment, each of computational hardware 802 and computational hardware 806 comprises one or more ALUs that perform mathematical functions, such as linear algebraic functions, only on information stored in code and/or data storage 801 and code and/or data storage 805, respectively, result of which is stored in activation storage 820.

In at least one embodiment, each of code and/or data storage 801 and 805 and corresponding computational hardware 802 and 806, respectively, correspond to different layers of a neural network, such that resulting activation from one "storage/computational pair 801/802" of code and/or data storage 801 and computational hardware 802 is provided as an input to "storage/computational pair 805/806" of code and/or data storage 805 and computational hardware 806, in order to mirror conceptual organization of a neural network. In at least one embodiment, each of storage/computational pairs 801/802 and 805/806 may correspond to more than one neural network layer. In at least one embodiment, additional storage/computation pairs (not shown) subsequent to or in parallel with storage computation pairs 801/802 and 805/806 may be included in inference and/or training logic 815.

Virtualized Computing Platform

Figure 9:
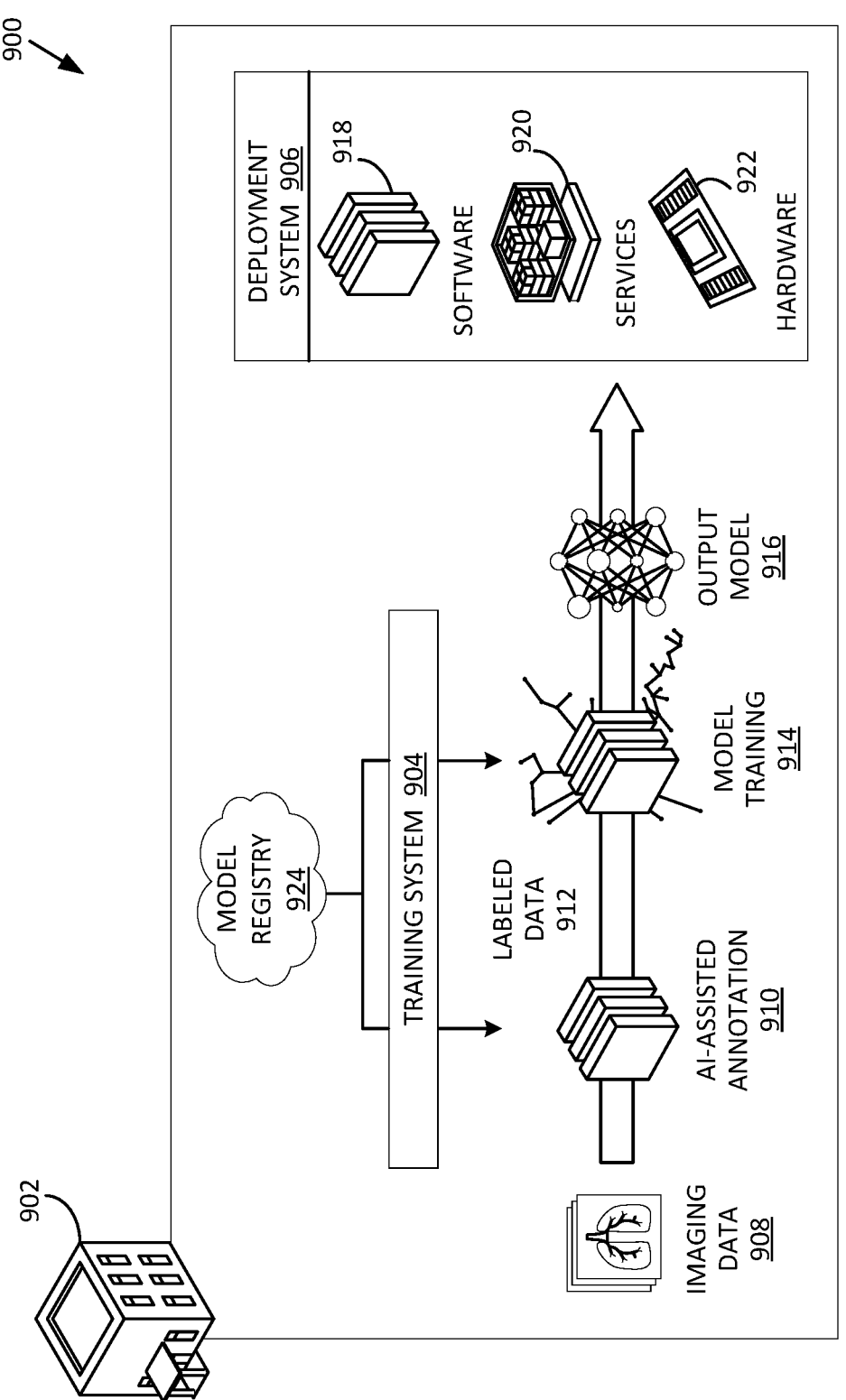
FIG. 9 is an example data flow diagram for an advanced computing pipeline, in accordance with at least one embodiment.

FIG. 9 is an example data flow diagram for a process 900 of generating and deploying an image processing and inferencing pipeline, in accordance with at least one embodiment. In at least one embodiment, process 900 may be deployed for use with imaging devices, processing devices, and/or other device types at one or more facilities 902. Process 900 may be executed within a training system 904 and/or a deployment system 906. In at least one embodiment, training system 904 may be used to perform training, deployment, and implementation of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, one or more applications in a pipeline may use or call upon services (e.g., inference, visualization, compute, AI, etc.) of deployment system 906 during execution of applications.

In at least one embodiment, some of applications used in advanced processing and inferencing pipelines may use machine learning models or other AI to perform one or more processing steps. In at least one embodiment, machine learning models may be trained at facility 902 using data 908 (such as imaging data) generated at facility 902 (and stored on one or more picture archiving and communication system (PACS) servers at facility 902), may be trained using imaging or sequencing data 908 from another facility(ies), or a combination thereof. In at least one embodiment, training system 904 may be used to provide applications, services, and/or other resources for generating working, deployable machine learning models for deployment system 906.

In at least one embodiment, model registry 924 may be backed by object storage that may support versioning and object metadata. In at least one embodiment, object storage may be accessible through, for example, a cloud storage (e.g., cloud 1026 of FIG. 10) compatible application programming interface (API) from within a cloud platform. In at least one embodiment, machine learning models within model registry 924 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1004 (FIG. 10) may include a scenario where facility 902 is training their own machine learning model, or has an existing machine learning model that needs to be optimized or updated. In at least one embodiment, imaging data 908 generated by imaging device(s), sequencing devices, and/or other device types may be received. In at least one embodiment, once imaging data 908 is received, AI-assisted annotation 910 may be used to aid in generating annotations corresponding to imaging data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of imaging data 908 (e.g., from certain devices). In at least one embodiment, AI-assisted annotations 910 may then be used directly, or may be adjusted or fine-tuned using an annotation tool to generate ground truth data. In at least one embodiment, AI-assisted annotations 910, labeled clinic data 912, or a combination thereof may be used as ground truth data for training a machine learning model. In at least one embodiment, a trained machine learning model may be referred to as output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from a model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10), a scenario may include facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 may not be fine-tuned or optimized for imaging data 908 generated at facility 902 because of differences in populations, robustness of training data used to train a machine learning model, diversity in anomalies of training data, and/or other issues with training data. In at least one embodiment, AI-assisted annotation 910 may be used to aid in generating annotations corresponding to imaging data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled clinic data 912, or a combination thereof—may be used as ground truth data for retraining or updating a machine learning model. In at least one embodiment, a trained machine learning model may be referred to as output model 916, and may be used by deployment system 906, as described herein.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906. In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 908, in addition to containers that receive and configure imaging data for use by each container and/or for use by facility 902 after processing through a pipeline (e.g., to convert outputs back to a usable data type). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, a data processing pipeline may receive input data (e.g., imaging data 908) in a specific format in response to an inference request (e.g., a request from a user of deployment system 906). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1000 (e.g., for accuracy), an application may be available in a container registry for selection and/or implementation by a user to perform one or more processing tasks with respect to data at a facility (e.g., a second facility) of a user.

Figure 10:
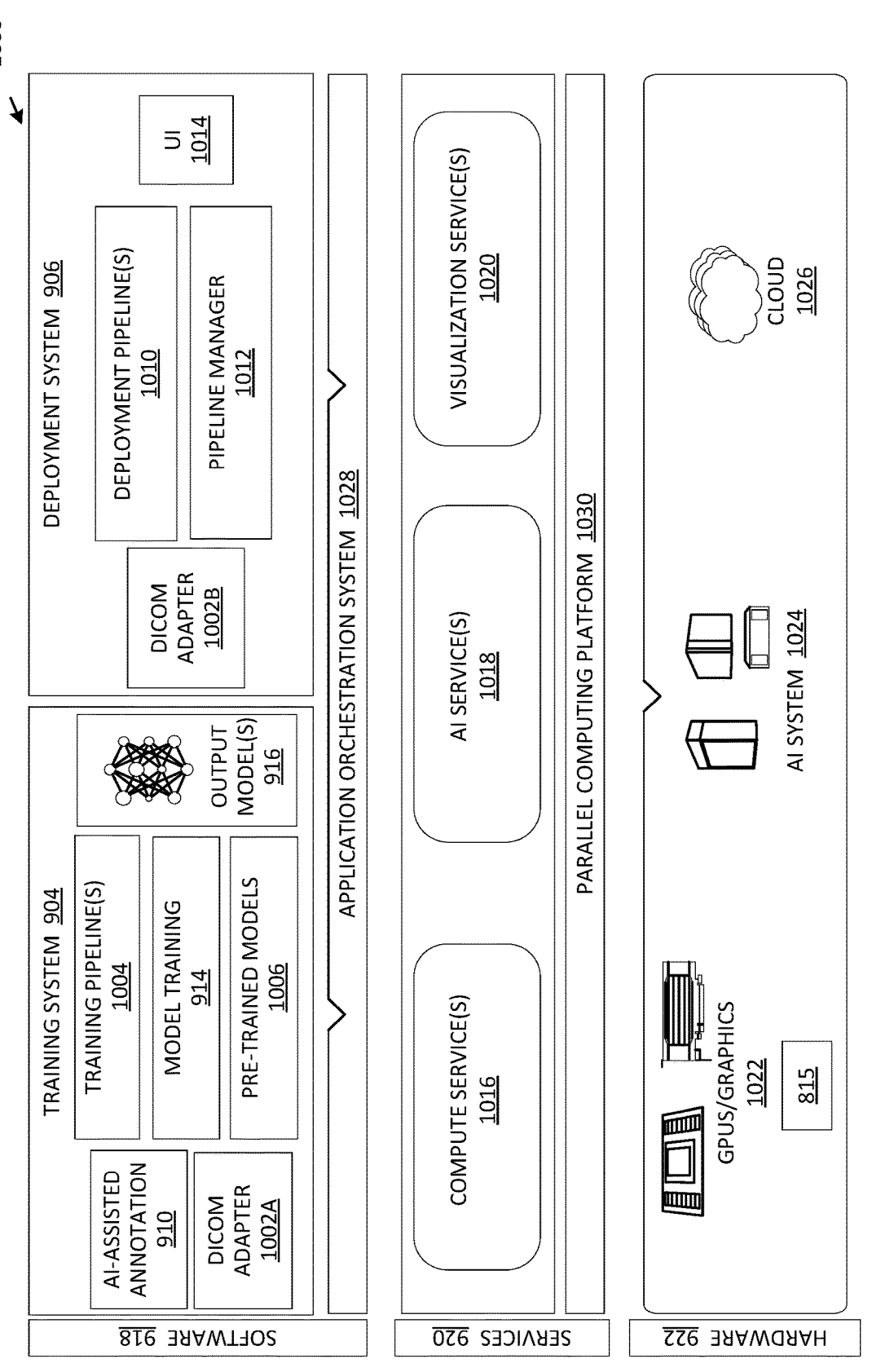
FIG. 10 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity—who provides an inference or image processing request—may browse a container registry and/or model registry 924 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 906 (e.g., a cloud) to perform processing of data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel (e.g., using a parallel computing platform 1030

(FIG. 10)). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 920 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline that includes segmentation application and anomaly detection application may be streamlined because each application may call upon a same inference service to perform one or more inferencing tasks.

In at least one embodiment, hardware 922 may include GPUs, CPUs, graphics cards, an AI/deep learning system (e.g., an AI supercomputer, such as NVIDIA's DGX), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of image processing and generation. In at least one embodiment, software 918 and/or services 920 may be optimized for GPU processing with respect to deep learning, machine learning, and/or high-performance computing, as non-limiting examples. In at least one embodiment, at least some of computing environment of deployment system 906 and/or training system 904 may be executed in a datacenter one or more supercomputers or high performance computing systems, with GPU optimized software (e.g., hardware and software combination of NVIDIA's DGX System). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying an imaging deployment pipeline, in accordance with at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may implemented in a cloud computing environment (e.g., using cloud 1026). In at least one embodiment, system 1000 may be implemented locally with respect to a healthcare services facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public IPs that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g. pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, such as but not limited to imaging data (or other input data) conversion or adaption In at least one embodiment, for different machine learning models used by deployment system 906, different training pipelines 1004 may be used. In at least one embodiment, training pipeline 1004 similar to a first example described with respect to FIG. 9 may be used for a first machine learning model, training pipeline 1004 similar to a second example described with respect to FIG. 9 may be used for a second machine learning model, and training pipeline 1004 similar to a third example described with respect to FIG. 9 may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904. and may be implemented by deployment system 906.

In at least one embodiment, output model(s) 916 and/or pre-trained model(s) 1006 may include any types of machine learning models depending on implementation or embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 908 (or other data type used by machine learning models), there may be corresponding ground truth data generated by training system 904. In at least one embodiment, AI-assisted annotation may be performed as part of deployment pipelines 1010; either in addition to, or in lieu of AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions. In at least one embodiment, system 1000 may be communicatively coupled to (e.g., via encrypted links) PACS server networks of one or more facilities. In at least one embodiment, system 1000 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 902). In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1010 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1010 depending on information desired from data generated by a device. In at least one embodiment, where detections of anomalies are desired from an MRI machine, there may be a first deployment pipeline 1010, and where image enhancement is desired from output of an MRI machine, there may be a second deployment pipeline 1010.

In at least one embodiment, an image generation application may include a processing task that includes use of a machine learning model. In at least one embodiment, a user may desire to use their own machine learning model, or to select a machine learning model from model registry 924. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1000—such as services 920 and hardware 922—deployment pipelines 1010 may be even more user friendly, provide for easier integration, and produce more accurate, efficient, and timely results.

In at least one embodiment, deployment system 906 may include a user interface 1014 (e.g., a graphical user interface, a web interface, etc.) that may be used to select applications for inclusion in deployment pipeline(s) 1010, arrange applications, modify or change applications or parameters or constructs thereof, use and interact with deployment pipeline(s) 1010 during set-up and/or deployment, and/or to otherwise interact with deployment system 906. In at least one embodiment, although not illustrated with respect to training system 904, user interface 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples, pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1028) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 920 leveraged by and shared by applications or containers in deployment system 906 may include compute services 1016, AI services 1018, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in at least one embodiment, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline (s) 1010 may use one or more of output models 916 from training system 904 and/or other models of applications to perform inference on imaging data. In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA and/or QUADRO GPUs) may include any number of GPUs that may be used for executing processing tasks of compute services 1016, AI services 1018, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment. AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TENSOR RT), provide an accelerated parallel computing API and platform 1030 (e.g., NVIDIA's CUDA), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

What is claimed is:

1. A method comprising:
identifying placement data associated with a plurality of cells of an integrated circuit (IC) design, wherein the placement data indicates an initial placement location for each of the plurality of cells of the IC design;
generating a graph based on the identified placement data, wherein one or more nodes of the graph correspond to a respective cell of the plurality of cells and a region of the IC design that are associated with the initial placement location for the respective cell, and wherein one or more edges of the graph correspond to a connection between two or more of the plurality of cells;
providing the graph as input to a machine learning model, wherein the machine learning model is trained to predict, based on a given graph associated with cells according to a respective IC design, a congestion level for cells at one or more bounding areas of the respective IC design;
obtaining one or more outputs of the machine learning model, wherein the one or more outputs comprise congestion data indicating a congestion level for a first bounding area of the IC design, the first bounding area comprising at least one region, of the IC design, associated with the initial placement location of one or more of the plurality of cells; and
responsive to determining that the indicated congestion level for the first bounding area satisfies one or more congestion criteria, designating the plurality of cells for installation at the at least one region, of the IC design, corresponding to the first bounding area.

2. The method of claim 1, wherein the congestion data further indicates a respective congestion level for each of one or more second bounding areas of the IC design, and wherein determining that the indicated congestion level for the first bounding area satisfies the one or more congestion criteria comprises:
determining that, at least one of:
the indicated congestion level for the first bounding area falls below a threshold congestion level, or
the indicated congestion level for the first bounding area is lower than the respective congestion level for each of the one or more second bounding areas.

3. The method of claim 1, wherein generating the graph based on the identified placement data comprises:
generating one or more first nodes and one or more first edges of the graph, wherein each of the one or more first nodes represent at least one of the plurality of cells, and wherein each of the one or more first edges represents a logical connection between two or more respective cells of the plurality of cells, according to the identified placement data;

generating one or more second nodes and one or more second edges of the graph, wherein each of the one or more second nodes represent a respective region of the IC design, and wherein each of the one or more second edges represent a physical boundary between at least one node of the one or more second nodes and an adjacent node of the one or more second nodes; and
updating a mapping between at least one of the one or more first nodes and a corresponding node of the one or more second nodes, wherein the corresponding node is associated with the region of the IC design associated with the initial placement location for the at least one of the one or more first nodes.

4. The method of claim 1, wherein the indicated congestion level comprises at least one of a cell utilization level for the plurality of cells at the first bounding area or a wire utilization level for wires connecting the plurality of cells at the first bounding area, and wherein the at least one of the cell utilization level or the wire utilization level corresponds to a percentage of the first bounding area utilized by the plurality of cells and the wires.

5. The method of claim 1, wherein identifying the placement data associated with the plurality of cells of the IC design comprises:
providing an indication of the plurality of cells as input to an additional machine learning model, wherein the additional machine learning model is trained to predict, based on an indication of one or more cells for inclusion in a respective IC design, a preliminary placement location for each of the one or more cells according to one or more IC design techniques;
obtaining one or more outputs of the additional machine learning model; and
extracting, from the one or more outputs of the additional machine learning model, the placement data associated with the plurality of cells of the IC design.

6. The method of claim 1, further comprising:
providing data associated with at least one of cell-level features, grid-level features, or design-level features of the IC design with the graph as input to the machine learning model, wherein the machine learning model is further trained to predict the congestion level for the one or more bounding areas of the respective IC design based on at least one of given cell-level feature data, given grid-level feature data, or given design-level feature data.

7. The method of claim 1, wherein the machine learning model is a graph convolution neural network model.

8. A system comprising:
a memory device; and
a processing device coupled to the memory device, wherein the processing device is to perform operations comprising:
generating training data for training a machine learning model to predict a congestion level for cells at one or more bounding areas of an integrated circuit (IC) design, wherein the training data comprises:
a training input comprising a graph associated with a plurality of cells of a prior IC design, wherein one or more nodes of the graph correspond to a respective cell of the plurality of cells and a region of the prior IC design that included the respective cell, and wherein one or more edges of the graph correspond to a connection between two or more of the plurality of cells according to the prior IC design;
a target output for the training input, wherein the target output comprises an indication of a congestion level for a prior bounding area of the prior IC design, the prior bounding area comprising at least one region, of the prior IC design, including one or more of the plurality of cells; and providing the training data to train the machine learning model on (i) a set of training inputs comprising the training input and (ii) a set of target outputs comprising the target output.

9. The system of claim 8, wherein the target output further comprises an indication of a respective congestion level for each of one or more additional prior bounding areas of at least one of the prior IC design or another prior IC design.

10. The system of claim 8, wherein the training input further comprises data associated with at least one of cell-level features, grid-level features, or design-level features of the IC design.

11. The system of claim 8, wherein the indicated congestion level for the prior bounding area comprises at least one of a cell utilization level for the plurality of cells at the prior bounding area or a wire utilization level for wires connecting the plurality of cells at the prior bounding area, and wherein the at least one of the cell utilization level or the wire utilization level corresponds to a percentage of the prior bounding area utilized by the plurality of cells and the wires.

12. The system of claim 8, wherein the indicated congestion level is determined based on a signal traffic measured for an IC fabricated according to the prior IC design.

13. The system of claim 8, wherein the graph comprises:
one or more first nodes and one or more first edges, wherein each of the one or more first nodes represent at least one of the plurality of cells of the prior IC design, and wherein each of the one or more first edges represent a logical connection between two or more respective cells of the plurality of cells,
one or more second nodes and one or more second edges, wherein each of the one or more second nodes represent a respective region of the prior IC design, and where each of the one or more second edges represent a physical boundary between at least one node of the one or more second nodes and an adjacent node of the one or more second nodes, and
a mapping between at least one of the one or more first nodes and a corresponding node of the one or more second nodes, wherein the corresponding node is associated with the region of the prior IC design that included a respective cell associated with the at least one of the one or more first nodes.

14. A non-transitory computer-readable storage medium comprising instructions that, when executed by a processing device, cause a processing device to perform operations comprising:
identifying placement data associated with a plurality of cells of an integrated circuit (IC) design, wherein the placement data indicates an initial placement location for each of the plurality of cells of the IC design;
generating a graph based on the identified placement data, wherein one or more nodes of the graph correspond to a respective cell of the plurality of cells and a region of the IC design that are associated with the initial placement location for the respective cell, and wherein one or more edges of the graph correspond to a connection between two or more of the plurality of cells;
providing the graph as input to a machine learning model, wherein the machine learning model is trained to predict, based on a given graph associated with cells according to a respective IC design, a congestion level for cells at one or more bounding areas of a respective IC design;
obtaining one or more outputs of the machine learning model, wherein the one or more outputs comprise congestion data indicating a congestion level for a first bounding area of the IC design, the first bounding area comprising at least one region, of the IC design, associated with the initial placement location of one or more of the plurality of cells; and
responsive to determining that the indicated congestion level for the first bounding area satisfies one or more congestion criteria, designating the plurality of cells for installation at the at least one region, of the IC design, corresponding to the first bounding area.

15. The non-transitory computer-readable storage medium of claim 14, wherein the congestion data further indicates a respective congestion level for each of one or more second bounding areas of the IC design, and wherein determining that the indicated congestion level for the first bounding area satisfies the one or more congestion criteria comprises:
determining that, at least one of:
the indicated congestion level for the first bounding area falls below a threshold congestion level, or
the indicated congestion level for the first bounding area is lower than the respective congestion level for each of the one or more second bounding areas.

16. The non-transitory computer-readable storage medium of claim 14, wherein generating the graph based on the identified placement data comprises:
generating one or more first nodes and one or more first edges of the graph, wherein each of the one or more first nodes represent at least one of the plurality of cells, and wherein each of the one or more first edges represents a logical connection between two or more respective cells of the plurality of cells, according to the identified placement data;
generating one or more second nodes and one or more second edges of the graph, wherein each of the one or more second nodes represent a respective region of the IC design, and wherein each of the one or more second edges represent a physical boundary between at least one node of the one or more second nodes and an adjacent node of the one or more second nodes; and
updating a mapping between at least one of the one or more first nodes and a corresponding node of the one or more second nodes, wherein the corresponding node is associated with the region of the IC design associated with the initial placement location for the at least one of the one or more first nodes.

17. The non-transitory computer-readable storage medium of claim 14, wherein the indicated congestion level comprises at least one of a cell utilization level for the plurality of cells at the first bounding area or a wire utilization level for wires connecting the plurality of cells at the first bounding area, and wherein the at least one of the cell utilization level or the wire utilization level corresponds to a percentage of the first bounding area utilized by the plurality of cells and the wires.

18. The non-transitory computer-readable storage medium of claim 14, wherein identifying the placement data associated with the plurality of cells of the IC design comprises:
providing an indication of the plurality of cells as input to an additional machine learning model, wherein the additional machine learning model is trained to predict, based on an indication of one or more cells for inclusion in a respective IC design, a preliminary placement location for each of the one or more cells according to one or more IC design techniques;

obtaining one or more outputs of the additional machine learning model; and extracting, from the one or more outputs of the additional machine learning model, the placement data associated with the plurality of cells of the IC design.

19. The non-transitory computer-readable storage medium of claim 14, further comprising:

providing data associated with at least one of cell-level features, grid-level features, or design-level features of the IC design with the graph as input to the machine learning model, wherein the machine learning model is further trained to predict the congestion level for the one or more bounding areas of the respective IC design based on at least one of given cell-level feature data, given grid-level feature data, or given design-level feature data.

20. The non-transitory computer-readable storage medium of claim 14, wherein the machine learning model is a graph convolution neural network model.

* * * * *